Sept. 18, 1962  J. H. BOWMAN ET AL  3,054,288
AUTOMATIC DATA SYSTEM FOR FAN TESTING
Filed June 15, 1959  8 Sheets-Sheet 7

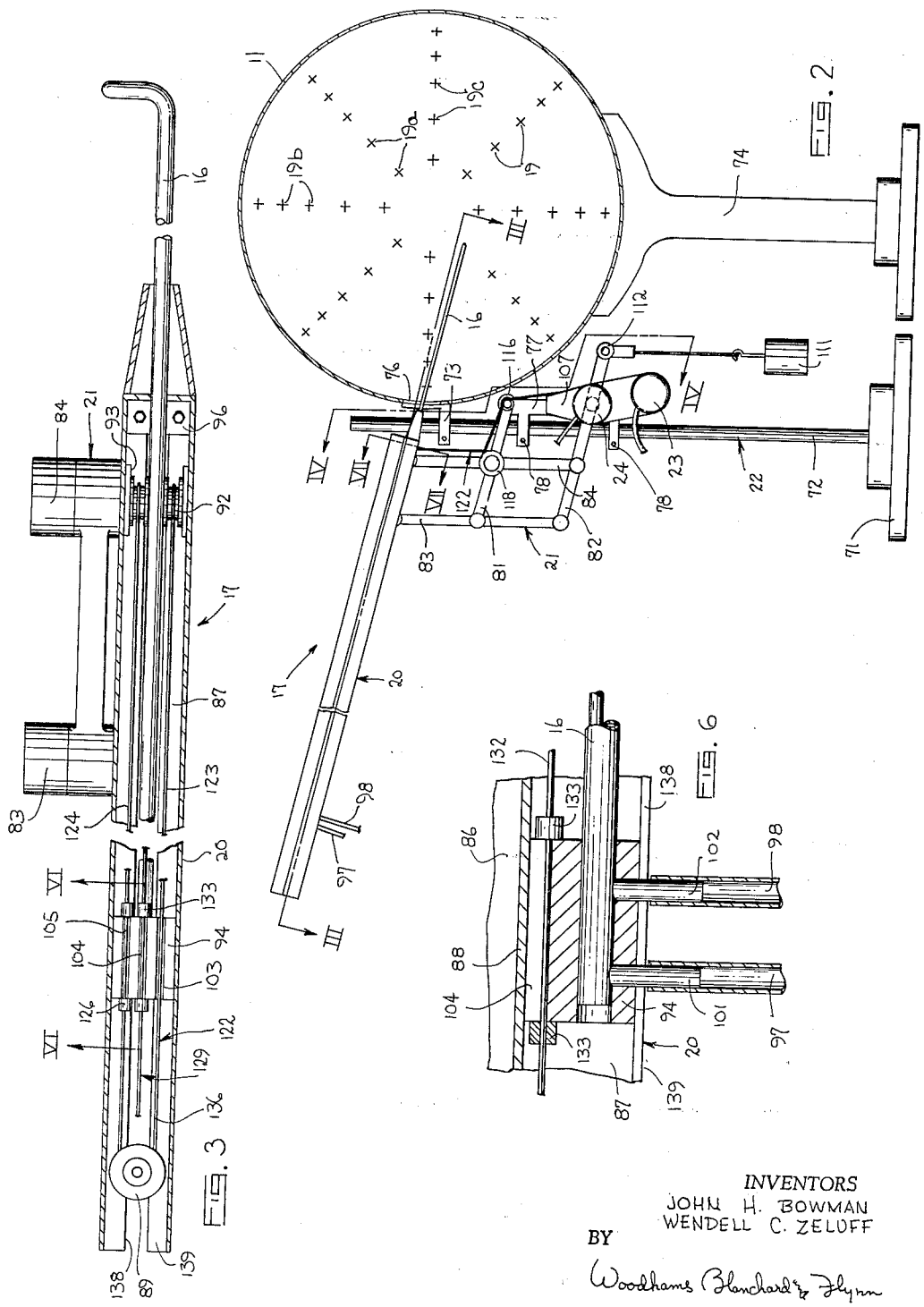

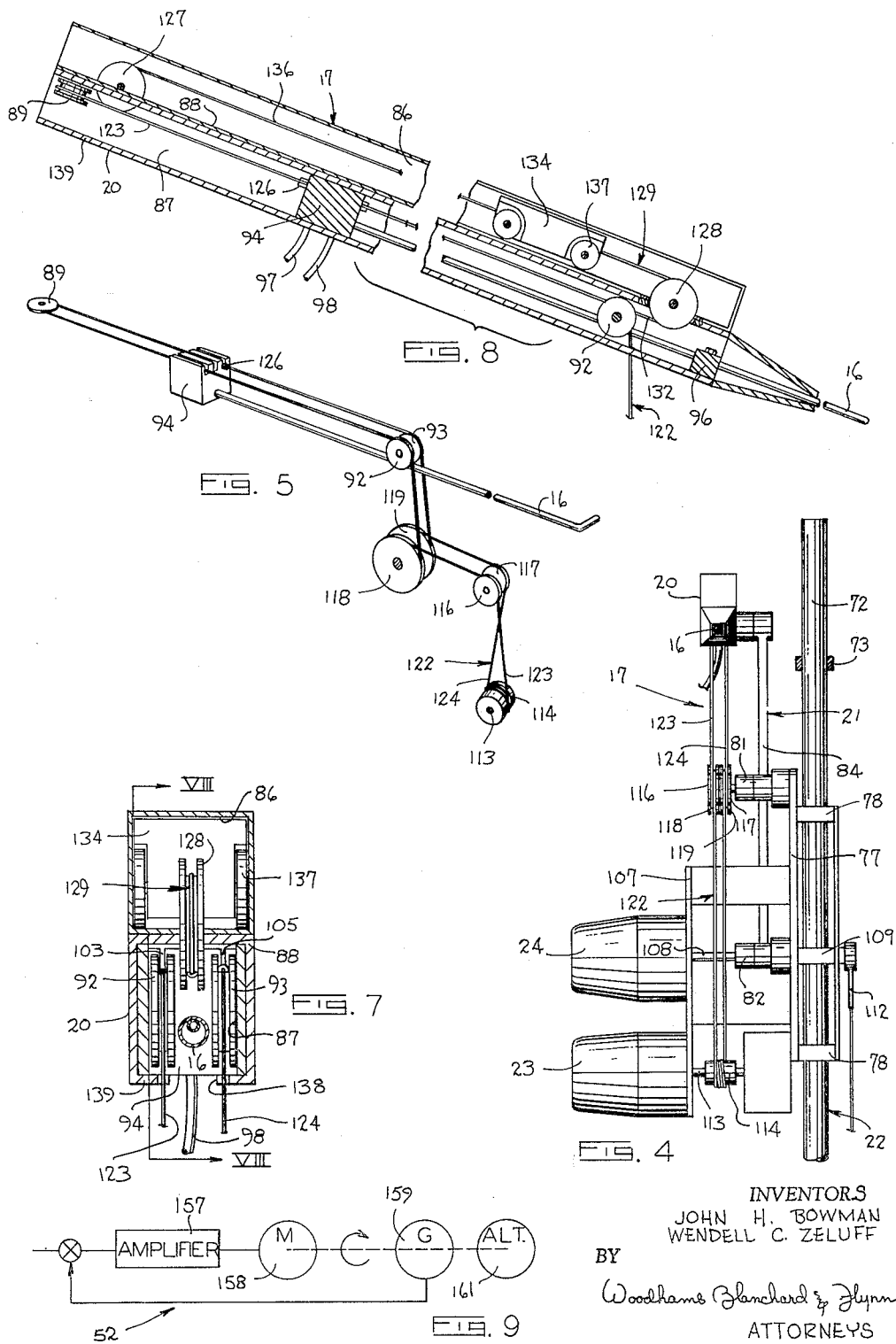

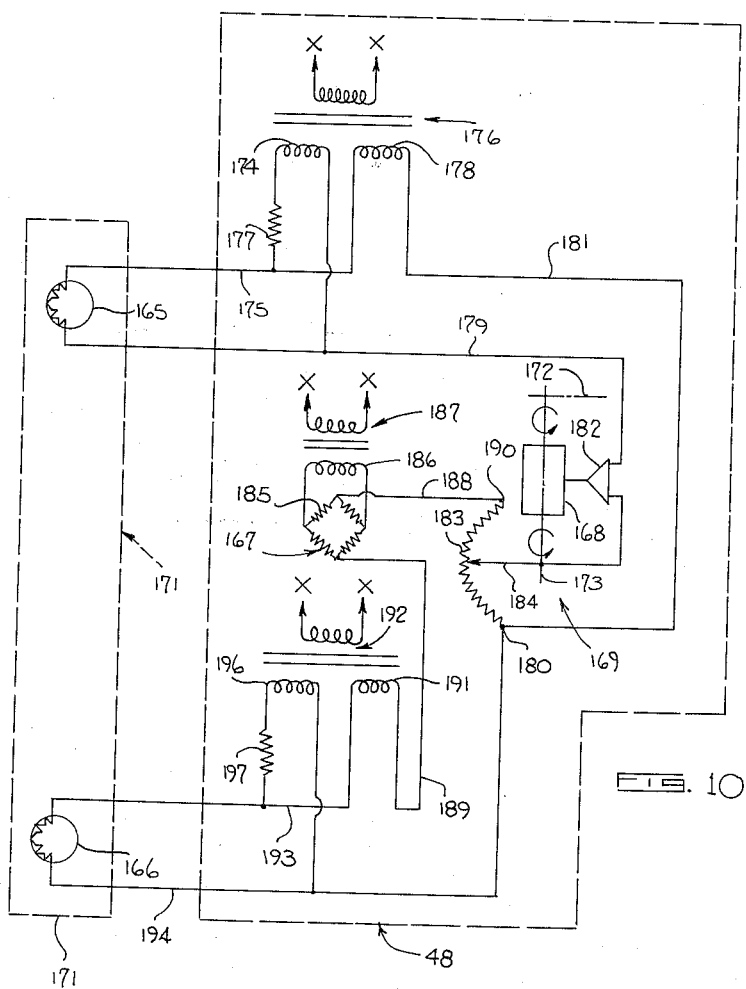
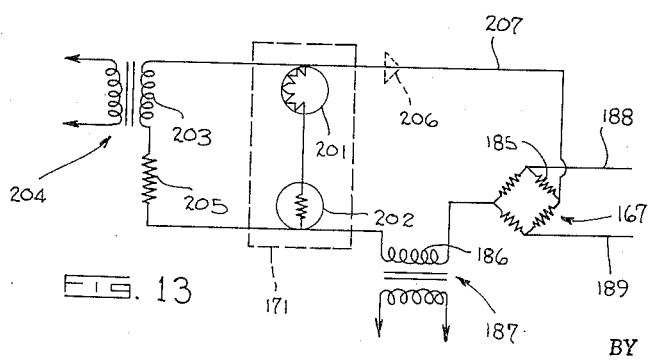

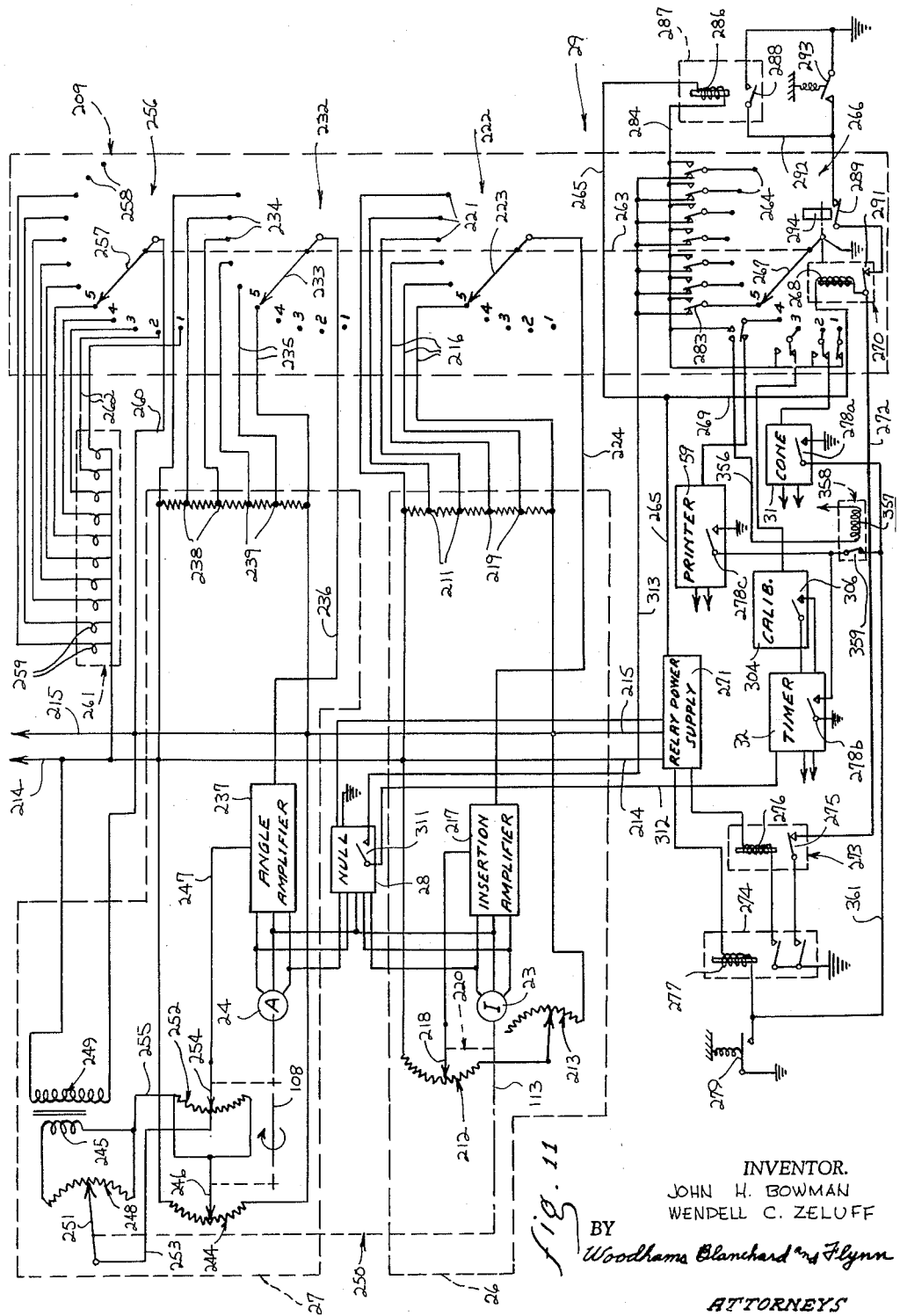

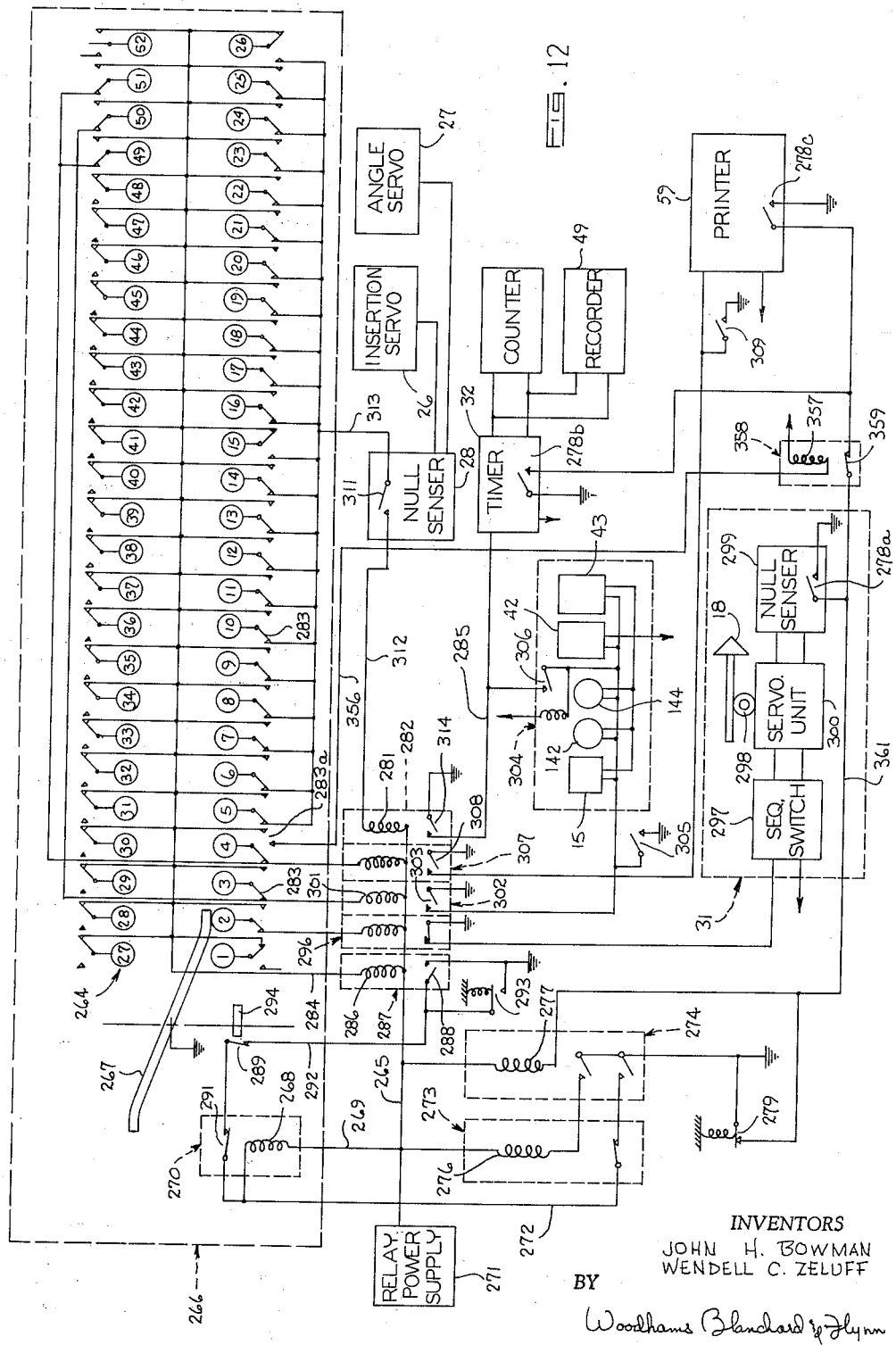

INVENTOR.
JOHN H. BOWMAN
WENDELL C. ZELUFF
BY
Woodhams Blanchard and Flynn
ATTORNEYS Sept. 18, 1962  J. H. BOWMAN ET AL  3,054,288
AUTOMATIC DATA SYSTEM FOR FAN TESTING
Filed June 15, 1959  8 Sheets-Sheet 8

INVENTOR.
JOHN H. BOWMAN
WENDELL C. ZELUFF
BY
Woodhams, Blanchard and Flynn
ATTORNEYS

United States Patent Office 3,054,288
Patented Sept. 18, 1962

3,054,288
AUTOMATIC DATA SYSTEM FOR FAN TESTING
John H. Bowman, Kalamazoo Township, Kalamazoo County, and Wendell C. Zeluff, Cooper Township, Kalamazoo County, Mich., assignors to Clarage Fan Company, Kalamazoo, Mich., a corporation of Michigan
Filed June 15, 1959, Ser. No. 820,299
19 Claims. (Cl. 73—168)

This invention relates in general to a method and apparatus for detecting, computing and recording certain characteristics of a fluid in motion and, more particularly, to a type of such apparatus which is arranged to conduct automatically a performance test of a gas moving fan, to record automatically the test data as it is collected, to compute the test data, both during and after its collection, into certain resultant determinations, and to record such determinations.

It has been for many years, and still is, standard practice to test the performance of gas moving equipment, such as centrifugal or axial flow fans, according to carefully approved procedures. For a detailed description of these procedures, as well as a disclosure of representative apparatus by means of which such procedures are presently carried out, reference is made to Bulletin No. 110, Second Edition, of the National Association of Fan Manufacturers, Incorporated, Detroit 26, Michigan. Briefly, and as an example of one test procedure, plates 1 and 2 on page 19 of said bulletin illustrate a centrifugal type fan connected to one end of an outlet duct, the other end of which is provided with an adjustable cone for controlling the outlet opening. A Pitot tube for sensing pressures is inserted through an opening in the side wall of the outlet duct and connected to a pair of manometers which are arranged to indicate total and velocity pressures.

According to existing test requirements, as set forth in said Bulletin 110, it is necessary to move the sample sensing end of the Pitot tube transversely through the path of the moving gas along two transverse lines, which two lines are referred to as traverses. The minimum test requirements also necessitate that there be ten, carefully arranged test positions located along each traverse, and that the traverses intersect each other at right angles at the center line of the duct. The location of the test points along a given traverse are supposed to be carefully set according to a division of the cross-sectional area of the duct into annular zones of equal area. Under normal test conditions, the ten readings along each traverse must be made at eight or more different determinations or gates covering a range of performance from approximately free delivery to no delivery, such gates being made at approximately equal increments of capacity. The delivery or gates may be controlled by adjusting the location of a cone in the end of the outlet duct in a well-known manner.

According to one of the most common procedures, the Pitot tube is supported upon a pair of guide racks disposed at right angles to each other and located so that they are aligned with and adjacent to a pair of openings in the side wall of the duct which defines the path of gas flow. The Pitot tube is usually manually moved in successive steps along each rack so that its sampling end occupies each of the test positions as accurately as this can be done. The cone, which controls the delivery of the fan, is also usually manually moved from one gate position to the next.

An alternate test method, known as the "chamber-nozzle" method, makes use of a chamber divided into two sections by a partition. The fan under test discharges into the first section. In the dividing partition are mounted a number of different sized, closable and calibrated nozzles through which all air must flow. The air then flows through an opening in the end of the second section and into a fan having variable, controlled capacity to compensate for the friction of the second section and the nozzles under certain conditions. The gate or fan performance condition is varied by opening one or more nozzles in sequence. Pressures are measured by manometers which are appropriately connected to the sections of said chamber.

The normal characteristics of air flow under test conditions are such that the fluid within a manometer continually fluctuates during the test operation, and it is very difficult to obtain accurate readings by visual procedures. Experience is required to detect the average of the fluctuations for reasonably consistent results. Even so, an entire test is frequently voided because one or more test points appear to exceed the required accuracy limits.

When complying only with the minimum requirements of the test code for conducting performance tests, the running of such a test and computing the results have normally required approximately twenty-four man hours and a total elapsed time of at least eight hours. The instrumentation set-up and calibration require approximately three additional hours. Accordingly, if the test results are unacceptable, an entire working day is usually lost before such fact becomes apparent.

Many such tests are required to determine the effects of component changes in the course of developing a new fan design. Thus, the total time presently required to conduct complete tests on newly designed or improved fan structures may exceed weeks or even months, even if the tests are performed and computed accurately in each instance.

It will be seen from the foregoing that the present procedures and equipment for conducting performance tests of gas moving equipment have created a number of problems, some of which are as follows:

(1) Experienced personnel are required to conduct satisfactory tests, to obtain acceptable test data and to compute the proper results and determinations from the test data collected.

(2) Because of the experience level required of the persons who must conduct the tests, and the time presently required for such tests, the test costs are often excessively high and, and in many instances, may preclude testing or make it necessary to accept less than completely satisfactory results.

(3) Because of the time required and the boredom experienced in collecting the test data and computing the results, it is difficult to attract and retain properly qualified personnel for this purpose, and the cost of training and maintaining an adequate staff of such personnel creates a heavy economic burden upon manufacturers of air handling equipment.

(4) The total elapsed time required for conducting and completely computing a performance test, according to the existing procedures and with existing equipment, may produce inherent inaccuracies due to drift of instrument calibrations and atmospheric changes. Many of these errors, which can develop during a prolonged test run, could be reduced, if not avoided, by reducing the testing time.

(5) Each performance test on a different type of fan equipment must be preceded by a careful arrangement and check-out of the test apparatus. Moreover, when there is a change in the size of duct from one performance test to another, a completely different arrangement of the test apparatus, including the guides for the Pitot tube, may be required in order to get the proper spacing of the various test positions for the Pitot tube along a particular traverse. Accordingly, where tests involving many different duct sizes are required over a relatively short period of time it is essential to have a variety of guide racks for the Pitot tubes readily available to accommodate all of these various duct sizes. The three-hour period required for arranging existing test apparatus is based on the assumption that the Pitot supporting guides are at least available and require little more than minor modification to arrange for a given test run. If a complete new set of Pitot supporting guides are required, the "set-up" time is materially increased.

(6) Two men are often required to operate existing test apparatus while data is being collected. In order to avoid differences in judgment, it is desirable to use the same test team throughout any given test, thereby adding materially to the monotony of the job. The readings and determinations made during the test run are at least partially dependent upon the physical senses and abilities of the test operators. The present procedures for collecting the test data depend heavily on the accuracy of the observer in making visual determination. Thus, the health and well-being of the persons conducting the tests can affect in no small amount the accuracy or lack of accuracy in a given test.

(7) At least one person is normally required to carry out the boring and menial task of manually moving the Pitot tube from one test position to the next along a given traverse within the test duct. After the test data is collected, the further boring and time-consuming task of converting the test data into usable information must be performed. Moreover, the computation and interpretation of the test data require skilled technicians who are usually the same persons who conducted the test.

(8) The Pitot tube, when inserted into a duct and supported externally, tends to droop from the desired position, and the amount of droop increases with the amount of insertion into the duct. To complicate the problem, the droop will vary somewhat with the angle of insertion with respect to a horizontal plane. Heretofore, little has been done about this tube droop, which sometimes exceeds an inch. Thus, particularly with ducts of large diameter, it has been known that present procedures produce inaccurate results whenever the insertion of the Pitot tube into the duct approaches its maximum horizontal extent.

Accordingly, a primary object of this invention has been the provision of a method and apparatus for at least minimizing and, in some instances, overcoming the above-mentioned problems which are presently encountered while conducting performance tests upon fluid handling equipment according to existing procedures.

A further object of this invention has been the provision of a method and apparatus, as aforesaid, whereby the collecting and computing of test data can be carried out substantially automatically in a minimum of time, and wherein the computing and recording of the test data in final form is completed almost simultaneously with the collection of the data.

A further object of this invention has been the provision of a method and apparatus, as aforesaid, by which a test can be carried out by relatively inexperienced persons who have received a minimum of instructions, and which will produce test results that are more accurate and more reliable than test results produced according to existing practices by the most skilled of test observers.

A further object of this invention has been the provision of apparatus for conducting performance tests on air handling equipment, which apparatus is relatively inexpensive to operate, which is simple in its operation, which is self-calibrating and which is easily and quickly adaptable to a variety of test conditions without changing the basic test procedure.

A further object of this invention has been the provision of test apparatus, as aforesaid, which overcomes inherent errors in existing procedures, which errors arise both from the apparatus presently used and from the physical limitations of the persons operating the test apparatus.

Other objects and purposes of this invention will become apparent to persons familiar with this type of equipment upon reading the following specification and examining the accompanying drawings, in which:

FIGURE 2 is a sectional view substantially as taken along the line II—II in FIGURE 1.

FIGURE 3 is a sectional view taken along the line III—III in FIGURE 2.

FIGURE 4 is a sectional view substantially as taken along the line IV—IV in FIGURE 2.

FIGURE 5 is an oblique, fragmentary view of part of the positioning mechanism for the Pitot tube.

FIGURE 6 is a sectional view taken along the line VI—VI in FIGURE 3.

FIGURE 7 is a sectional view taken along the line VII—VII in FIGURE 2.

FIGURE 8 is a sectional view taken along the line VIII—VIII in FIGURE 7.

FIGURE 9 is a diagrammatic view of a velocity servo unit.

FIGURE 10 is a diagrammatic view of an air density computer and the sensing head therefor.

FIGURE 11 is a circuit diagram of a portion of the electrical circuitry utilized in the apparatus shown in FIGURE 1.

FIGURE 12 is a circuit diagram of a portion of the programming circuitry.

FIGURE 13 is an alternate structure for a portion of the circuitry in FIGURE 10.

For convenience in description, the terms "upper," "lower" and derivatives thereof will have reference to the apparatus in its normal position of use, as appearing in FIGURE 2. The terms "inner," "outer" and derivatives thereof will have reference to the geometric center of said apparatus and parts associated therewith.

GENERAL DESCRIPTION

Figure 1:
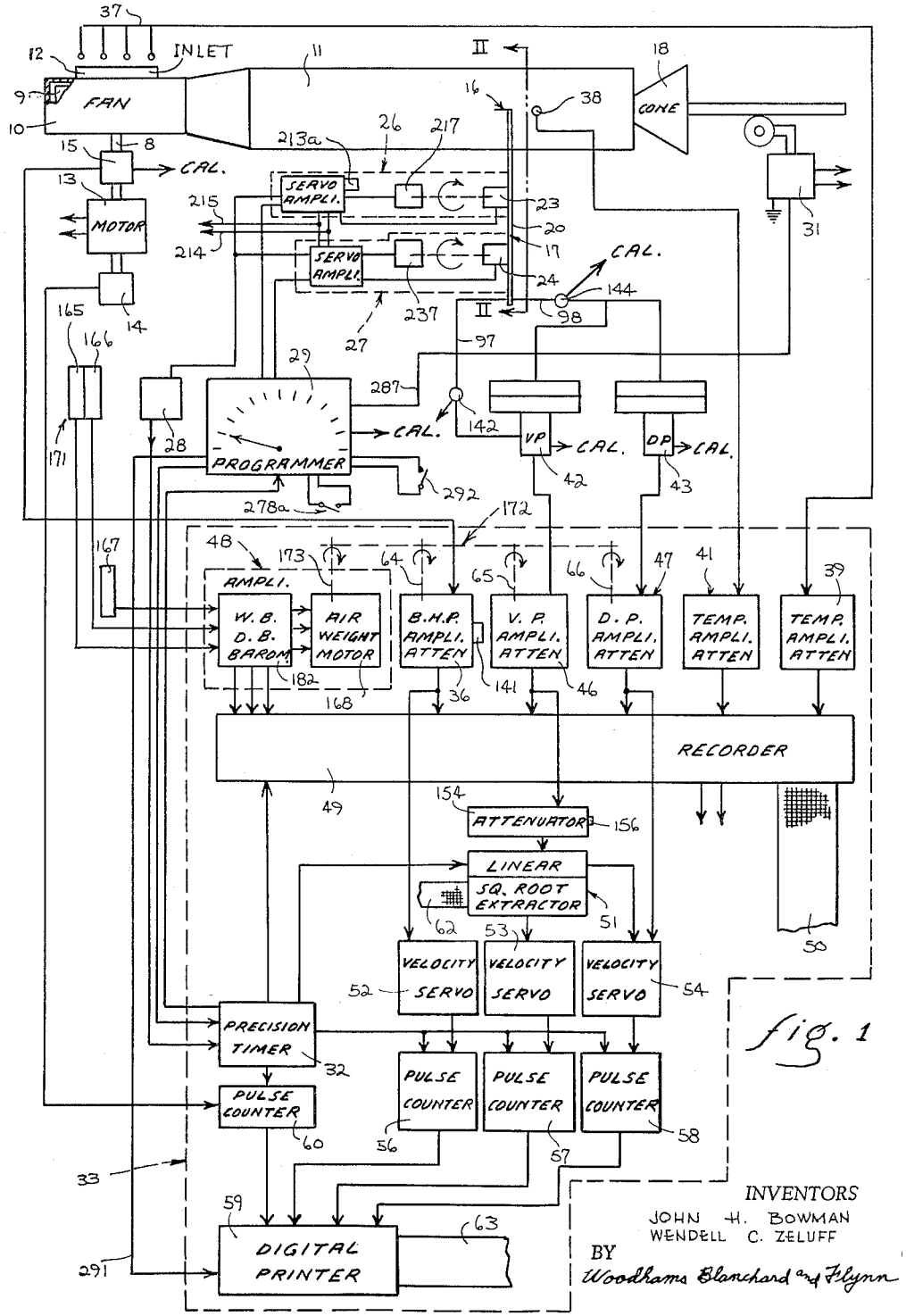
FIGURE 1 is a diagrammatic view of an apparatus embodying the invention and by means of which the method can be carried out.

The objects of the invention, including those set forth above, have been met by providing a method and an apparatus, the latter being of the type shown in FIGURE 1, for testing the performance of a gas moving device having a duct connected thereto for defining a path along which the gas is moved by said device. More specifically, a centrifugal fan is connected to a duct having an opening through the side wall thereof and means associated with the outlet ends of said duct for controlling the delivery of the fan. A Pitot tube of suitable size and shape is slidably supported upon a positioning member so that said tube extends through the opening in the side wall of said duct. The Pitot positioning member is in turn supported upon a mounting structure by means of linkage which is capable of pivoting said Pitot tube around an axis parallel with the axis of the duct and adjacent to the opening in the side wall of the duct.

Drive mechanism is provided for effecting movement of the Pitot tube lengthwise thereof whereby the insertion of the Pitot tube through the side opening in said duct is controlled. Other drive means is provided for pivoting the linkage and thereby controlling the angle at which said Pitot tube enters said duct with reference to a substantially horizontal diameter of the duct. The two drive means for effecting insertion and angular movement of the Pitot tube may include a pair of closed loop servo units which are powered by amplifiers controlled by a programming device, such as a stepping switch. Accordingly, operation of the Pitot tube through a sequence of preselected positions can be automatically controlled by said stepping switch.

The pressures sensed by the Pitot tube are conducted to strain-gauge transducers which convert such pressures into electrical potentials. The atmospheric conditions in various selected locations around the equipment being tested are detected and are also converted into electrical potentials. The fan impeller is rotated by means, such as a motor, which is preferably operated at a constant speed. The torque applied by the motor to rotate the impeller is detected and converted into an electrical potential. Accordingly, all of the essential data normally collected during a performance test of a gas moving device is converted into electrical potentials and fed into a computer unit which is capable of integrating and storing these various electrical potentials and recording them both as line graphs and as digital records.

The servo amplifiers associated with the positioning of the Pitot tube are connected through a null sensing device to a timer which is in turn connected to both the integrating and the recording elements of the computer unit, as well as to the programming device. Accordingly, movement of the Pitot tube by the servo units into a new position must be completed before the computer and recorder unit can commence their operation. The ultimate digital print-out of the data collected by the computer unit during a traverse is also controlled by the programming device.

DETAILED CONSTRUCTION

The test apparatus shown in FIGURE 1 illustrates one particular embodiment of the invention. It is believed that the method of the invention can best be disclosed by describing in detail the apparatus shown in FIGURE 1, which is capable of carrying out the method.

In order to facilitate a complete disclosure and understanding of the invention, the structure including the principal components of the apparatus, as appearing in FIGURE 1, will first be summarized briefly. This summary will then be enlarged upon by a more detailed description of the components, which are considered in groups as follows:

(1) The mechanism for supporting and positioning the Pitot tube;

(2) The unit for collecting, integrating and recording data; and (3) The control circuitry, including the programming device.

As shown in FIGURE 1 for illustrative purposes only, the gas moving equipment being tested in this particular embodiment is comprised of a centrifugal type blower fan 10 having its outlet connected to one end of an outlet duct 11 and having an inlet 12 which is substantially unobstructed. It will be understood that the centrifugal fan, which includes a housing containing an impeller 9, can be replaced by an axial flow fan and that an inlet duct may be connected to the inlet 12. Such variations are well known, and are dependent upon the type of performance test desired and the type of equipment being tested. The impeller of the fan 10 is rotated by means of a motor 13, which is preferably arranged to operate at a constant rotational speed by means of a speed control 14. For example, a type LBE-155 "Select-A-Speed" control having a BC-42 tachometer generator, as manufactured by the Louis Allis Company of Milwaukee, Wisconsin, may be used as the speed control 14. Thus, the control 14 will also produce an electrical pulse proportional to the motor r.p.m. for reasons appearing hereinafter. A torque pickup 15 of substantially conventional construction is provided for the purpose of sensing the torque applied by the motor and providing a proportional electrical potential.

A Pitot tube 16, which detects impact and static pressures, is inserted into the duct 11 through an opening 76 in the side wall thereof and is supported upon a Pitot tube positioner 17, which is shown in detail in FIGURE 2. The Pitot tube positioner is capable of moving the Pitot tube 16 lengthwise thereof, hence, transversely of the duct 11, and pivotally around the point at which said Pitot tube extends through the side wall of the duct 11. The volume delivery from the fan 10 is controlled by a gate or cone 18 supported adjacent to the outlet end of the duct 11. The cone may be controlled by the programming device 29 operating through a servo unit 31.

The Pitot tube positioner 17 (FIGURES 2 and 3) includes an elongated beam 20 which is supported by means of a pantographic type of linkage 21 upon the support structure 22, which is anchored with respect to the duct 11. Servo motors 23 and 24 (FIGURE 1) which are parts of the servo units 26 and 27, respectively, are mounted upon the support structure 22 (FIGURE 2) for the purpose of effecting the lengthwise and pivotal movement of the Pitot tube 16. Briefly, the Pitot tube 16 can be moved by the motors 23 and 24 so that its inner or sensing end will assume any desired position within said duct 11, and particularly along the transverse traverse lines 19, 19a, 19b and 19c.

The servo units 26 and 27 (FIGURE 1) are connected to a programming device 29, which includes a stepping switch, function relays, and manual and automatic switches. Null sensing devices, such as relay 28, and a timer 32, which may be a part of the computing and recording unit 33, are connected back to the programming device 29 for the purpose of effecting its operation.

The computer unit 33 is designed to receive, integrate, compute, and record data collected in various forms and at various points around the equipment being tested. More specifically, said computer unit includes amplifier-attenuators, an air density unit, a strip recorder, a square root extractor, velocity servo units, a timer, pulse counters and a print-out unit, which are connected to sensing devices capable of responding to certain conditions and converting the response into electrical potentials. For example, the torque pickup 15 supplies an electrical potential to the amplifier-attenuator 36, in which this potential is multiplied by a constant representing the constant r.p.m. to produce an output proportional to brake horsepower. The temperature sensing instruments 37 and 38 are electrically connected to the amplifier-attenuators 39 and 41, respectively.

A pair of strain-gauge transducers 42 and 43 are connected to the Pitot tube 16 and to the amplifier-attenuators 46 and 47, respectively. An air density computer 48 is connected to the amplifiers 36, 46 and 47 to correct the inputs thereto for density. The several amplifier-attenuators and the air density computer 48 are connected to a recorder 49 which produces plots on the tape 50 of the basic test data corrected where required for air density. The amplifiers 36, 46, 47 are also connected through appropriate components including the recorder 49, the velocity servos 52, 53 and 54 and the counters 56, 57 and 58 to the digital printer 59. The square root extractor 51 records a voltage proportional to the c.f.m. on a tape 62. The digital printer 59 prints out, in this particular embodiment, the dynamic pressure, the brake horsepower, the c.f.m. and r.p.m. on the tape 63. The timer 32 is connected to the recorder 49 and the counters 56, 57, 58 and 60 for the purpose of controlling the recording and counting interval. The programming device 29 is connected to the digital printer 59 for the purpose of effecting a print-out at the end of each gate or determination, as well as a print-out of the state of calibration which is provided before and after each determination.

POSITIONING MECHANISM FOR THE PITOT TUBE

The Pitot tube positioner 17 (FIGURE 2) includes a support structure 22 which is comprised of a base 71 and an upright post 72, which is secured to the duct 11 by means of a bracket 73. Said duct 11 is preferably supported between its ends by means such as the pedestal 74. A Pitot tube opening 76 is provided through the side of the duct 11 adjacent to the bracket 73. A mounting plate 77 (FIGURES 2 and 4) is supported by means of the clamps 78 upon the post 72 so that it defines a plane substantially perpendicular to the lengthwise axis of the duct 11.

The linkage 21 includes a pair of parallel, vertically spaced bars 81 and 82 (FIGURES 2 and 4) which are pivotally supported at corresponding ends upon the mounting plate 77, said bars being pivotable about parallel axes perpendicular to said mounting plate 77. A pair of parallel and substantially vertical bars 83 and 84 are pivotally supported near their lower ends upon the lower bar 82 at points spaced from each other. The leftward vertical bar 83, as appearing in FIGURE 2, is preferably pivoted at its lower end upon the leftward end of the lower bar 82. The rightward vertical bar 84 is preferably pivoted at its lower end upon the lower bar 82 at a point between the ends thereof. Said vertical bars 83 and 84 are also pivotally supported at a point between their upper and lower ends upon the upper bar 81, the left vertical bar being pivotally supported at the left end of the upper bar 81 and the right vertical bar 84 being pivotally engaged with said upper bar 81 at a point between the ends thereof. Accordingly, the bars 81 through 84, inclusive, are arranged to form a pantograph. The bars 83 and 84 are parallel with the centerline between the pivot points of the bars 81 and 82 upon the mounting plate 77. A center line through the pivot axes of the bars 81 and 82 upon the plate 77 is preferably tangent to the duct 11 across the Pitot tube opening 76 therein.

The vertical bars 83 and 84 (FIGURE 2) are disposed on that side of the post 72 remote from the duct 11 and their upper ends pivotally engage and support the beam 20 near its rightward end which beam slidably supports the Pitot tube 16. The beam 20 is preferably parallel with the bars 81 and 82 and the pivot points therebetween are preferably spaced from the bar 81 the same distance as the spacing between the center of the opening 76 in the duct 11 and the bar 81.

As shown in FIGURES 7 and 8, the guide beam 20 is an elongated hollow member which, in this particular embodiment, has upper and lower lengthwise compartments 86 and 87 divided by a partition 88. A pulley 89 (FIGURE 8) is rotatably supported upon the lower surface of the partition 88 near its outer or leftward end for rotation about an axis perpendicular to said partition. A pair of spaced, co-axial pulleys 92 and 93 (FIGURE 7) are rotatably supported upon the side walls of the lower compartment 87 near the inner or rightward end. The Pitot tube 16, which extends between the pulleys 92 and 93, is mounted at its outer end within the slide block 94 and is supported at its inner end upon the guide member 96. The slide block 94 is slidable lengthwise of and within the lower compartment 87. As thus supported by the beam 20, the Pitot tube 16 advantageously extends at all times while in operating condition through the approximate center of the opening 76 in the duct 11.

A pair of pipes 101 and 102 (FIGURE 6) are mounted within the slide block 94 and connected to the static pressure and total pressure passageways, respectively, within the Pitot tube 16. The pipes 101 and 102 are also connected to the flexible tubes 97 and 98, respectively, which are connected to the transducers 42 and 43 (FIGURE 1). The upper surface of the slide block 94 is provided with three spaced parallel grooves 103, 104 and 105 (FIGURE 3), which extend lengthwise of the beam 20.

A motor bracket 107 (FIGURE 4) is mounted upon the mounting plate 77 to support the servo motors 23 and 24. The shaft 108 of the servo motor 24 is secured to the rightward end of the lower horizontal bar 82 and is co-axial with the pivot axis thereof. Said shaft 108 extends beyond the bar 82 and is engaged by a counterbalance arm 112 which extends from the shaft 108 in the opposite direction from the lower horizontal bar 82.

Thus, rotation of the servo motor 24, which is also referred to as the angle motor 24, effects a movement of the lower bar 82, hence of the linkage 21, whereby the beam 20 and Pitot tube 16 are pivoted around an axis passing through the Pitot tube opening 76 and parallel with the axis of the duct 11. The weight of the linkage 21 and the beam 20, which tends to rotate the shaft 108 in a counter-clockwise direction, as viewed in FIGURE 2, is counteracted by the counterweight 111, which is supported upon the outer end of the balance arm 112.

The servo motor 23 (FIGURE 4), which is also supported by the motor bracket 107, has a shaft 113 which is parallel with the shaft 108 and which supports a cable drum 114. A pair of pulleys 116 and 117, which are preferably equal in diameter to each other and to the diameter of the pulleys 92 and 93 (FIGURE 5), are rotatably supported upon the mounting plate 77 co-axial with the pivot axis of the rightward end of the upper horizontal bar 81. A pair of large pulleys 118 and 119 (FIGURE 4) and are rotatably supported upon and co-axial with the pivot axis between the upper horizontal bar 81 and rightward vertical bar 84. Said pulleys 118 and 119 are advantageously twice as large in effective diameter as the pulleys 89, 92, 93, 116 and 117, for reasons appearing hereinafter. If the diameters of the pulleys 92, 93, 116 and 117 are unequal, as they can be, then it is necessary that the sum of the diameters of pulleys 93 and 117 equals the diameter of pulley 119 and the sum of the diameters of pulleys 92 and 116 equals diameter of pulley 118.

An endless cable 122 (FIGURES 4 and 5) is wrapped several times around the drum 114 and has a pair of substantially co-extensive reaches 123 and 124, which extend around respective ones of the pulleys 89, 92, 93, 116 to 119, inclusive. The two reaches of the cable 122 extend between approximately 180 and 360 degrees around the large pulleys 118 and 119, and between approximately zero and 180° around the pulleys 92, 93, 116 and 117. By this arrangement, it is possible to pivot the linkage 21 upon the mounting plate 77 without producing additional tension or slack in the cable 122.

The reaches 123 and 124 (FIGURE 3) of the cable 122 disposed within the lower compartment 87 are slidably inserted into the two outside grooves 103 and 105 (respectively) in the slide block 94. The reach 124, for example, is engaged by a pair of stops 126 on opposite sides of the slide block 94, whereby movement of such reach lengthwise of the beam 20 effects a corresponding movement of the slide block 94, hence the Pitot tube 16. As shown in FIGURE 3, the lower wall 139 of the lower compartment 87 has a lengthwise slot 138 through which the tubes 97 and 98 may extend as the slide block 94 moves lengthwise of the lower compartment 87.

A pair of pulleys 127 and 128 (FIGURE 8) are rotatably supported within the opposite ends of the beam 20 for rotation about substantially parallel and horizontal axes located within the opposite ends of said upper compartment 86. The pulleys 127 and 128 preferably extend slightly through the partition 88 into the lower compartment 87. An endless cable 129 extends around the pulleys 127 and 128 and its lower reach 132, which lies within the lower compartment, is disposed within the center groove 104 (FIGURE 3) in the slide block 94. A pair of stops 133 are secured to the lower reach 132 on opposite sides of the slide block 94 for the purpose of effecting movement of the cable 129 around the pulleys 127 and 128 in response to movement of the slide block lengthwise of the beam 20. A counterweight 134 is secured to the upper reach 136 of the cable 129 for movement therewith lengthwise of and within the upper compartment 86. The counterweight 134 may be provided with rollers 137 by means of which said counterweight is supported upon said partition 88 for movement lengthwise thereof. As the Pitot tube is urged out of the rightward end of the beam 20 (FIGURE 8) the weight 134 is moved leftwardly away from the pivot axis of the beam 20. Thus, counterweight 134 in the upper compartment 86 is made to counteract the movement around said pivot axis of the beam 20, which movement is produced by the Pitot tube 16 as it extends through the Pitot opening 76 into the duct 11.

DATA COLLECTING AND INTEGRATING SYSTEM

As indicated above, the computing unit 33 (FIGURE 1) is provided for the purpose of receiving, in the form of electrical potentials, the data collected by the transducers 42 and 43 and resistance bulb thermometers 37 and 38, for example, and converting such potentials into visual recordations of various types.

More specifically, the computing and recording unit 33 includes a substantially conventional amplification and attenuation unit 36, wherein the attenuation can be manually set by means of the control knob 141 for a given r.p.m. The torque pickup 15, which may be of the type manufactured by Baldwin Lima Hamilton Corporation of Philadelphia, Pennsylvania and designated as Baldwin SR-4 Model D1197, is electrically connected to the amplification stage of the amplifier-attenuator 36. The amplifier 36 receives an electrical potential proportional to the torque produced by the motor 13 in operating the fan 10, and multiplies it by the r.p.m. factor set into the attenuator to produce an output potential proportional to brake horsepower. The temperature sensitive devices 37 and 38 (FIGURE 1), which may be resistance thermometers, type 8163-C sold by Leeds and Northrup Company of Philadelphia, Pennsylvania, are electrically connected to the amplification and attenuation units 39 and 41, respectively. Accordingly, electrical potentials proportional to the temperatures detected by the thermometers 37 and 38 are fed into the amplifiers 39 and 41, respectively, and then into the recorder 49.

The static-pressure tube 97 (FIGURE 1) connects the Pitot tube 16 through an electrically operated two-way valve 142 to one side of a pressure transducer 42, such as the model PM–197 TCA pressure transducer sold by Stratham Laboratories, Inc., of Los Angeles, California. The total pressure tube 98 connects the Pitot tube 16 through the electrically operated twoway valve 144 to the other side of transducer 42 and a similar transducer 43. Accordingly, the transducer 42 will produce, in this particular embodiment, an electrical potential proportional to the velocity pressure or the difference between total and static pressures sensed by the Pitot tube 16. Transducer 42 is electrically connected to the amplification and attenuation unit 46 in the computing and recording unit 33. The transducer 43 develops an electrical potential proportional to the total pressure sensed by the Pitot tube 16 and is electrically connected to the amplification and attenuation unit 47 in said computing and recording unit 33.

The amplification and attenuation units 36, 39, 41, 46 and 47 (FIGURE 1) may be provided as independent components of the computing and recording unit 33, which are connected to the recorder 49, or they may be provided as part of the recorder 49. In the latter case, the recorder 49 may be an eight channel recorder of the type made by Sanborn Company of Cambridge, Massachusetts, and referred to as the Sanborn Series 150 recorder. The attenuation units 36, 46 and 47 have shafts 64, 65 and 66, respectively, which can be rotated to adjust potentiometers (not shown) and thereby control their output voltages.

The air density computer (FIGURE 1) described hereinafter, has a servo motor shaft 173 which is connected by linkage 172 to the shafts 64, 65 and 66 on the units 36, 46 and 47 for effecting the correction of their voltages for standard air density.

The amplifiers 36 and 47 (FIGURE 1) are also connected to the velocity servos 52 and 54, respectively. The amplifier 46 is connected through the attenuator 154, to the square root extractor and recorder 51, and thence to the velocity servo 53. The attenuator 154 may be of a substantially conventional type having a potentiometer (not shown) which is adjusted by the manual control 156 provided thereon for the purpose of adjusting the incoming potential for various duct sizes. The chart recorder 51 includes one linear translating slide wire and one square root translating slide wire whereby both linear and square root functions of the input voltage may be recorded and/or transmitted. A portion of the linear function is fed into the velocity servo 54, which also receives the output potential from the amplifier-attenuator 47 for the purpose of adding to the total pressure voltage, a voltage which represents the friction in the duct from the fan to the Pitot tube. The square root function generated in recorder 51 is fed to the velocity servo 53 and, at the same time, plotted on the tape 62. The strain gauge recorder 51 may be of the type offered by the Bristol Manufacturing Company of Waterbury, Connecticut under the name of Bristol Model IPD560–T2–T16–T7–T43.

Each of the velocity servos, such as the servo 52 shown by the block diagram in FIGURE 9, is comprised of a servo amplifier 157, which amplifies the input potential to the servo motor 158. The motor 158 is mechanically coupled with and rotates a generator 159 and alternator 161. The output of the generator 159 is connected to the input of the servo amplifier 157 in a well-known manner, and the alternator 161 generates an electrical pulse or alternating voltage, the frequency of which is directly proportional to, and varies accurately with, changes in the input potential to the servo amplifier 157. Alternatively, a Dymec Model Dy–2210 voltage to frequency converter, which is manufactured by Dymec Inc. of Palo Alto, California, may be used in place of each of the velocity servo units 52, 53 and 54.

The outputs of the alternators 161 (FIGURE 1) in the servos 52, 53 and 54 or the outputs of said frequency converters are connected to the counters 56, 57 and 58, respectively, which may be of the type referred to as the Model 7050 counter offered by the Berkley Division of Beckman Instruments, Inc. of Richmond, California. Said counters 56, 57 and 58 are of a conventional pulse counting type wherein the pulsations produced by the alternators in the velocity servos 52, 53 and 54, respectively, are received and counted during pre-selected periods of time. A pulse counter 60, which may be substantially identical with the pulse counter 56, for example, counts pulses transmitted by the speed control 14 during the same pre-selected periods of time, which pulses are proportional to the r.p.m. of the fan.

The digital printer 59 (FIGURE 1) may be of the type referred to as a Model 1452 printer having a Model 1541/3 scanner incorporated therewith and produced by the Berkley Division of Beckman Instruments, Inc. of Richmond, California. Said digital printer 59 is connected to the pulse counters 56, 57, 58 and 60 and records data in digits on the strip 63 in response to an electrical command from the programming device 29. For the sake of convenience, and as stated above, the printer 59 is combined with the counter 60, for example, as a combined counter and timer of the type indicated as Model 7060 by Berkley Division of Beckman Instruments, Inc. of Richmond, California. However, and as indicated in FIGURE 1, the timer 32 serves to control the starting and stopping of the recorder 49 as well as the counters 56, 57, 58 and 60. The timer 32 also controls the operation of the programming device 29, as discussed hereinafter.

AIR DENSITY COMPUTER

It is well known that certain fan performance data, such as velocity pressure, dynamic pressure and torque, very with the air density. It is common practice to refer or correct this data to a standard air density of 0.075 pound per cubic foot. This is accomplished by multiplying the values of such data by the ratio between the standard air density and the density of the air at the time of the test. The air density computer 48 (FIGURES 1 and 10) has been designed to sense and measure those factors controlling air density during a performance test, to furnish the measurements to a recorder for reference purposes, to compute air density from such measurements, and to furnish a mechanical drive, such as a shaft rotation, proportional to the ratio between the standard and test air densities. Such mechanical drive is then applied by the linkage 172 (FIGURE 1) to the potentiometer shafts 64, 65 and 66, on the amplifier-attenuators 36, 46 and 47, respectively, to correct their inputs for air density. It will be recognized that the computer 48 can be set to compute the density of gases other than air.

An expression or equation which is commonly used for determining air density is:

$$d = \frac{Pa - 0.38P'v}{RTd}$$

In this equation, $$P'v = Pw - \left[\frac{Pa \times (td-tw)}{2700}\right]$$

Accordingly, $$d = \frac{Pa(1+.000141ti) - .38Pw}{.37td+170.2}$$

In the above equations, the following definitions apply:

$d$=air density in pounds per cubic foot of air-water mixture at measured conditions.
$Pa$=barometric pressure in pounds per square inch.
$P'v$=vapor pressure of water vapor in air in pounds per square inch.
$R$=universal gas constant=0.370 in units of pounds per square inch.
$Td$=dry bulb temperature in degrees Rankin $(td+460)$.
$Pw$=vapor pressure of water vapor in air saturated at wet bulb temperature in pounds per square inch.
$td$=dry bulb temperature in degrees Fahrenheit.
$tw$=wet bulb temperature in degrees Fahrenheit.
$ti$=$td-tw$ (which is the wet bulb depression).

In the above equations, the controlling factors are $Pa$, $ta$, $tw$ and $Pw$. All of these factors except $Pw$ are easily and accurately measurable by electrical devices. For the normal range of wet bulb temperatures (45° to 80° F.), $Pw$ may be replaced by $.0104 \times tw - .345$, and the use of this expression will produce an error in the air density which is in the order of approximately 0.05% and, therefore, can be ignored.

The ratio between standard air density and test air density may be expressed as $$\bar{R} = \frac{.075}{d}$$

Thus, in view of the above equations relating to density $(d)$, the air density ratio can be expressed as $$\bar{R} = \frac{K_1 \times td + K_2}{Pa(K_3 \times ti + 1) - (K_4 tw - K_5)}$$

In this equation, the following definitions of terms apply:

$\bar{R}$=the ratio of the standard air density to the test air density, which is proportional to the shaft rotation produced by the computer 48 to correct the input to the amplifier-attenuators 36, 46 and 47 (FIGURE 1).

$K_1$=.02775
$K_2$=12.765
$K_3$=.000141
$K_4$=.00395
$K_5$=.1311

For most indoor areas, the wet bulb depression $(ti)$ varies from 0° to 30° F. and has an average value of 15° F. Thus, because $K_3 \times ti$ is very small compared to 1, $(K_3 \times ti + 1)$ in the equation for the ratio of density may be replaced with a constant (1.002) which is exactly correct when the wet bulb depression is 15° F. Under normal operating conditions, the use of such constant will not produce an error in the air density ratio which exceeds a maximum of .2%. The equation for the ratio density then becomes simplified to:

$$\bar{R} = \frac{K_1 \times td + K_2}{K_6 \times Pa - (K_4 tw - K_5)}$$

wherein $K_6$=1.002.

In general, the air density computer 48 (FIGURE 10) is designed to solve electrically the equation for the air density ratio $(\bar{R})$ and produce a shaft rotation in the servo motor 168 which is proportional to the air density ratio. The computer 48 is of the analogue type in which equation values are represented by voltages which are combined according to the terms of the equation by electrical components in the computer. More specifically, the air density computer 48 (FIGURES 1 and 10) includes a sensing head 171 consisting of a pair of thermometers 165 and 166 which have temperature sensitive resistances and are located near the fan 10. The thermometer 165 detects dry-bulb temperature and the thermometer 166 is fitted with a conventional dampened sock (not shown) for the purpose of detecting the wet-bulb temperature. The thermometers 165 and 166 may be of the type referred to as a "platinum thermohm" manufactured by Leeds and Northrup Company of Philadelphia, Pennsylvania. The air density computer 48 has a power source including the three transformers 176, 187 and 192 (FIGURE 10) and a servo motor 168 which provides the load. The servo motor 168 has a shaft 173 which is connected to the linkage 172 and is mechanically coupled with the wiper 184 of the potentiometer 183.

One side of the dry-bulb thermometer 165 (FIGURE 10) is connected in series with one secondary 178 of the transformer 176 and the conductor 181 to a common terminal 180 at one end of the slide wire on the potentiometer 183. The other side of the thermometer 165 is connected by the conductor 179 to the amplifier 182 which is connected both to the motor 168 and to the wiper 184 of potentiometer 183. Another secondary winding 174 of the transformer 176 is connected in series with a resistance 177 and both the secondary 174 and resistance 177 are connected in parallel with the dry-bulb thermometer 165.

The air density computer 48 (FIGURE 10) includes a pressure-sensitive device, such as the pressure transducer 167, which may be a strain-gauge transducer similar to the pressure transducers 42 and 43 discussed above. The transducer 167 has a bridge circuit 185 the input terminals of which are connected to the opposite ends of the secondary winding 186 on the transformer 187. One output terminal of the bridge circuit 185 is connected by the conductor 188 to the end 190 of the slide wire on the potentiometer 183. The other output terminal of the bridge circuit 185 is connected by the conductor 189, one secondary 191 of the transformer 192 and the conductor 193 to one side of the thermometer 166. The other side of said thermometer 166 is connected by the conductor 194 to the common point 180 on the potentiometer 183. Another secondary 196 on the transformer 192 and the resistance 197 are connected in series with each other and in parallel with the thermometer 166.

FIGURE 13 illustrates additional circuitry by means of which the circuitry of the density computer 48 may be modified to eliminate minor errors, which may be created by the air density computer 48 as shown in FIGURE 10. More specifically, the pressure transducer 167 has its output terminals connected to the conductors 188 and 189 which, as shown in FIGURE 10, are connected to the potentiometer 183 and the secondary 191. The input terminals of the bridge circuit 185 are connected in series with a conductor 207, a pair of resistance thermometers 201 and 202 and the secondary 186 of the transformer 187. The dry-bulb thermometer 201 may be substantially identical with the resistance thermometer 165. The wet bulb thermometer 202, which is fitted with a damp sock (not shown) in a conventional manner, may be a "thermister" of the type manufactured by Victory Engineering Company, Springfield Road, Union, New Jersey. In this particular embodiment, the thermometer 202 has a negative coefficient of resistance whereas the resistance thermometer 201 has a positive coefficient of resistance. The thermometers 201 and 202 are preferably located in the sensing head 171.

The secondary 203 of the transformer 204 is connected in series with a resistance 205 both of which are in parallel with the thermometers 201 and 202.

Operation of Air Density Computer

A voltage proportional to the dry bulb temperature ($td$) is furnished by the resistance thermometer or temperature transducer 165 (FIGURE 10), and a voltage proportional to the wet bulb temperature ($tw$) is furnished by a similar temperature transducer or resistance thermometer 166. A voltage proportional to barometric pressure ($Pa$) is furnished by the pressure transducer 167.

The values of the multiplying constants $K_1$, $K_6$ and $K_4$ in the air density ratio equation are obtained by properly selected input voltages which are supplied from the transformer secondaries 174, 196 and 186 to the temperature and pressure transducers. Additive constants $K_2$ and $K_5$ in the equation are provided by the appropriate insertion of fixed voltages from transformer secondaries 178 and 191 in series with the transducer outputs, the polarities of such voltages being arranged for the proper arithmetic sign. The operation of dividing the numerator by the denominator of the equations, and the conversion of the resultant quotient into a proportional shaft rotation of the servo motor 168 is performed by a closed loop servo system 169, in a manner discussed hereinafter. As shown in FIGURE 1, the individual voltage outputs of the barometric, dry bulb and wet bulb transducers are also furnished to the recorder 49 for record purposes.

Specific reference is now made to the manner in which the air density computer solves the equation for the air density ratio and produces a proportional rotation of the shaft 173.

A voltage proportional to the numerator ($K_1 \times td + K_2$) of the air density ratio equation is generated as follows:

A voltage from the secondary 174 (FIGURE 10) of the transformer 176 is applied to the dry bulb transducer 165 through the series resistor 177. The value of the resistor 177 is relatively large as compared to the resistance of the transducer 165 so that the current through the transducer 165 remains substantially constant, even though the resistance of the transducer 165 varies with temperature. The voltage across the transducer 165 is proportional to a constant residual resistance and to the temperature ($td$). The value of the applied voltage from the transformer secondary 174 is selected so that the current flowing through the transducer 165 produces a voltage proportional to ($K_1 td$) of the numerator. The residual resistance of the transducer 165 at 0° F. causes a voltage drop which is algebraically combined with the voltage produced by the series connected secondary 178 of said transformer 176 to produce a voltage proportional to the equation value ($K_2$). Thus, the electrical connection of these components develops a voltage drop between the conductors 179 and 181 which is proportional to the numerator of the equation ($K_1 td + K_2$).

The corrected output voltage of the dry bulb transducer 165 (FIGURE 10) is fed by conductor 179 to the differential amplifier 182, which supplies power to the servo motor 168. The corrected output of the dry bulb transducer 165 is fed by the conductor 181 to the end 180 of the servo potentiometer 183.

A voltage proportional to the denominator expression ($K_6 \times Pa$) is generated as follows:

A voltage from the secondary 186 (FIGURE 10) of the transformer 187 is applied to the input terminals of the bridge circuit 185 in the pressure transducer 167. The wires are distorted by, and thereby their resistance varies with, changes in the barometric pressure, so that the voltage output of the transducer 167 is proportional to ($Pa$). The voltage supplied to the transducer 167 is such that its output voltage is proportional to $K_6 \times Pa$. The output of the bridge circuit 185 is fed by conductor 188 to the end 190 of the servo potentiometer 183. The output of the bridge circuit 185 is also fed by the conductor 189 to the secondary winding 191 of the transformer 192.

A voltage proportional to the denominator expression ($K_4 tw - K_5$) is developed by the wet bulb temperature transducer 166, which is arranged in a circuit similar to that of the dry bulb transducer 165. That is, the transducer 166 is connected in parallel with the secondary 196 of the transformer 192 and in series with the pressure transducer circuit. Thus, the output voltage of the pressure transducer circuit is diminished by the output voltage of the wet bulb temperature circuit, thereby producing a voltage across terminals 180 and 190 of the potentiometer 183, which is proportional to $K_6 \times Pa - (K_4 tw - K_5)$, which is the entire denominator of the equation.

Whenever there is a change in temperature or pressure, the servo system of the computer 48 will become unbalanced and current will flow to the amplifier 182 from the wiper 184 or conductor 179. The current flow in the conductor 179 is opposed by the current flow from wiper 184, which thereby governs the direction and amount of rotation of the shaft 173. The wiper 184 is rotated with the shaft 173 until it creates a null at the amplifier and the servo system is again in balance.

If it becomes desirable to eliminate the relatively small error which may develop from use of the constant $K_6$, circuitry shown in FIGURE 13 may be added, as indicated, to the circuitry shown in FIGURE 10. That is, the circuitry of FIGURE 13, when added to FIGURE 10, produces an accurate voltage proportional to $$Pa(K_3 \times ti + 1)$$

Thus, instead of using the constant $K_6$ having a value of 1.002, the value of $K_3 \times ti$ is accurately computed.

More specifically, the temperature transducer 201 (FIGURE 13) senses dry bulb temperature and the temperature transducer 202, which is fitted with a damp sock (not shown) senses wet bulb temperature. The temperature transducers 201 and 202 are selected so that they have the same temperature coefficient of resistance, but opposite in slope or sign. Accordingly, a relatively constant current flowing through the transducers 201 and 202, which varies with temperature, produces a voltage which varies with the wet bulb depression and, therefore, is proportional to ($K_3 ti$).

A constant voltage, which is provided by the secondary 203 of the transformer 204 and placed in series with the temperature transducers 201 and 202 and a resistor 205, is algebraically combined with the voltage produced by the residual resistances of the transducers 201 and 202 at 0° F. wet bulb depression to produce a voltage proportional to (plus 1). Thus, the circuitry of FIGURE 13 produces a voltage proportional to ($K_3 ti + 1$), which when fed to the pressure transducer 167 causes said transducer to provide an output voltage which is proportional to $Pa(K_3 ti + 1)$.

Where it is necessary or desirable to use D.C. voltage in place of A.C. voltage in the test unit, the temperature transducers 201 and 202 may be replaced by a pair of thermocouples, such as copper-constantan thermocouples, which are connected so that the constantan terminals are together. In such case, the transformer 204 and resistor 205 are unecessary and an amplifier, shown in broken lines at 206, would be placed in the conductor 207. Moreover, the transformer 187 would be replaced by a suitable D.C. power source.

CONTROL CIRCUIT

The control circuitry or system for the test apparatus shown in FIGURE 1 and embodying the invention may take a variety of forms. For example, it may be a combined electrical and electronic circuit, as shown in FIGURE 11, which discloses a preferred embodiment of the invention, or it may be a combination of electrical and hydraulic or electrical and mechanical. Thus, it will be understood that the particular control system disclosed herein has been selected for illustrative purposes and is not intended to limit the scope of the invention.

Generally speaking, and as shown in FIGURE 1, the control circuit of the test apparatus includes the programming device 29, a servo unit 31 for controlling the operation of the cone 18 and a calibration circuit 304 shown in FIGURE 12. The control circuit is intended to exercise control over the operation of the Pitot tube positioner 17, the cone control unit 31 and the computor 33, whereby these components will be operated in proper sequence to conduct automatically a performance test of the fan 10.

The programming device 29 (FIGURE 11) includes a sequence switch 209, the relay power supply 271 and certain relays and switches described hereinafter. The stepping switch 209 has four levels which are referred to herein as the program level 266, the insertion level 222, the angle level 232 and the signal level 256. Each of said levels, as shown in FIGURE 12 with respect to the program level 266, has fifty-two terminals which are arranged to be engaged by a wiper in a substantially conventional manner. The program level 266 controls the initiation of some functions and the sequencing of most of the functions performed by the test apparatus. The stepping switch 209 may be of a conventional type whereein a spring actuated mechanism (not shown) is cocked by the coil 268 of the stepping relay 270 when said coil is energized. De-energization of said coil 268 releases the spring mechanism whereby it advances the wipers of the switch 209 one step. The coil 268 is connected by the conductors 269 and 265 to the relay power supply 271, and by the conductor 272 through the relays 273 and 274 to ground. Coil 268 is also connectible through its switch 291, the cam switch 289 and either the passing switch 288 or homing switch 293 to ground. The relay power supply 271 is in turn connected to a source of electrical energy by the conductors 214 and 215.

The detailed description of the stepping switch will, for convenience, commence with the insertion level and will include a description of the insertion servo unit 26 to which it is connected. Said insertion level 222 includes a plurality of terminals 221 which are engaged by a wiper 223 and which are connected by the conductors 216 to the taps 211 on a bank of resistances 219. The two end taps of the bank of resistances 219, which are connected in series with each other, are connected to the power input conductors 214 and 215. The wiper 223 is connected by the conductor 224 to the amplifier 217 of the servo unit 26, which amplifier supplies power to the insertion servo motor 23. The servo unit 26 includes the follow potentiometer 212 and a variable duct resistance 213 which are connected in series with the power supply conductors 214 and 215. The wiper 218 of the follow potentiometer 212 is connected electrically to the amplifier 217 and mechanically by the linkage 220 to the shaft 113 of the insertion motor 23. The variable duct resistance 213 is manually operated for the purpose of adjusting the insertion servo unit 26 for variations in the duct size. The insertion amplifier 217 is connected to a null detecting relay 28.

The angle level 232 of the stepping switch 209 includes a plurality of terminals 234 engaged by a wiper 233 and connected by the conductors 235 to the taps 238 on a bank of resistances 239. The end taps of the bank of resistances 239, which are connected in series, are connected to the power input conductors 214 and 215. The wiper 233 is connected by conductor 236 to the amplifier 237 of the angle servo unit 27. The angle servo unit 237 of the angle servo unit includes a follow potentiometer 244 connected to the power input conductors 214 and 215. The wiper 246 of the follow potentiometer 244 is connected to both ends of a cosine potentiometer 252 having a wiper 254 which is electrically connected to the angle amplifier 237 by a conductor 247. The wiper 254 and the wiper 246 are both mechanically connected to the shaft 108 of the angle motor 24, which is energized by the amplifier 237.

A transformer 249 has its secondary 245 connected in series with the slide wire of the potentiometer 248. Connected ends of the potentiometer 248 and the secondary 245 are connected by the conductor 255 to one end of the potentiometer 252. The wiper 251 of the insertion potentiometer 248 is connected to the center tap on the cosine potentiometer 252. The wiper 251 is mechanically connected by linkage 250 to the shaft 113 of the insertion motor 23. The amplifier 237 is also connected to the null sensing relay 28. The first four terminals on the insertion level 222 and angle level 232 are disconnected for reasons appearing hereinafter.

The signal level 256 has a wiper 257 which engages the terminals 258 and is connected to the power input line 215 by the conductor 260. The terminals 258 are connected individually and respectively by the conductors 262 to the lamps 259 in the lamp bank 261, which lamps are then connected to the power input conductor 214.

The program level 266 (FIGURES 11 and 12) includes a plurality of terminals 264 which are engaged by a wiper 267 and are individually connected to separate, manually operable double throw selector switches 283, each of which have a neutral position between the poles thereof. The wipers 267, 223, 233 and 257 are interconnected by linkage 263 for simultaneous operation in a substantially conventional manner. One pole of each selector switch is connected by a conductor 284 to the coil 286 of the passing relay 287, which is also connected by the conductor 265 to the relay power supply 271.

The stepping relay 270 has a coil 268 which is connected by the conductor 269 to the conductor 265, and conductor 265 is connected to the relay power supply 271. The coil 268 is connected through its own, normally closed switch 291, the cam switch 289 and the normally open, rapid advance or homing switch 293 to ground. A cam 294 is mechanically connected to the wiper 267 for opening the cam switch 289 when the wiper 267 (FIGURE 12) engages the terminal 52. The normally open switch 288 of the passing relay 287 is connected in parallel with the homing switch 293. The coil 268 of the relay 270 is also connected on the side of its switch 291 by conductor 272 to the normally closed switch 275 in the slow to open relay 273 and thence through a normally open switch of the starting relay 274 to ground. The coil 276 of the relay 273 is connected in series between the relay power supply 271 and a normally open switch in the relay 274. The coil 277 of the relay 274 is connected in series between the relay power supply 271 and the normally open "inching" switch 279, which is connected to ground. The relay coil 277 can also be grounded through any one of the completion switches 278a, 278b, and 278c, which are located in the cone servo unit 31, the timer 32 and the printer 59, respectively.

The first terminal 264 in the program level 266 is connected by its selector switch 283 to the coil 286 of the passing relay 287. The second terminal of the program level 266 (FIGURE 12) is connected by its selector switch 283 to the coil of an initiating relay 296, which is connected by the conductor 265 to the relay power supply 271. The switch of relay 296 is connected to a sequencing switch 297 in the cone operating unit 31 which may be similar to the sequencing switch 209. The cone operating unit includes a servo motor 298, a servo unit 300, which is controlled by the sequence switch 297, and the null senser 299, which contains the completion switch 278a. The servo unit 300 may be generally similar in construction to the insertion servo unit 26 described above.

The third terminal 264 (FIGURES 11 and 12) of the program level 266 is connected by its selector switch 283 to the coil 301 of the initiation relay 302. The switch 303 of relay 302 is connected to the calibration circuit 304, which is arranged for the purpose of conducting a calibration test upon the test apparatus. The calibration circuit 304 includes conventional electrical devices (not shown) for connecting calibration resistors into the transducer bridge circuits, and for operating the valves 142 and 144 so that the output voltage of said transducers will have value corresponding to a predetermined, known pressure.

The circuit 304 can be used for calibrating any other part of the circuit, such as the torque pick-up 15 and the transducers in the air density computer 48. The calibration circuit 304 includes a normally open, delayed operation relay 306, which energizes the timer 32 (FIGURE 12) after a predetermined period of time. A normally open, manually operable switch 305 is connected in parallel with the calibration relay switch 303 for enenergizing the calibration circuit 304 of the apparatus independently of the programming device 29.

The fourth terminal 264 (FIGURES 11 and 12) of the program level 266 is connected by its selector switch 283a to the coil of the printing relay 307. The switch 308 of relay 307 is connected between the printer 59 and ground. A normally open, manually operable switch 309 is connected in parallel with the printing relay switch 308 for energizing the printer 59 without using the programming device 29.

The null sensing relay 28 has a normally open switch 311 (FIGURE 12) connected by the conductor 312 to the coil 281 of the initiation relay 282. The switch 311 is also connected by conductor 313 to certain ones of the selector switches 283 of the program level 266. The switch 314 in relay 282 is connected by conductor 285 between timer 32 and ground.

FIGURE 12 discloses one arrangement of terminal connection for the program level 266 whereby the function levels 222 and 232 of the program switch 209 will be caused to move the Pitot tube 16 through a selected pattern of test positions. More specifically, the selector switches 283, which are connected to terminals 5 to 14 and 16 to 25, inclusive, are connected in parallel to the conductor 313 and thence through switch 311, conductor 312 and the coil 281 of relay 282 to the relay power supply 271. The terminals 1, 15, 26 and 48 are connected by their selector switches 283 to the passing relay 287, and the switch 283 on terminal 52 remains in neutral position. Terminal 50 in program level 266 is also connected to the initiating relay 302 for the calibration circuit 304. In this embodiment, the terminals 49 and 51, which precede and follow the calibration terminal 50, are also connected to the initiating relay 307 for the printer 59.

The first four terminals in levels 222 and 232 are connected in parallel with the terminals 5 thereof, since it is desired that the Pitot tube be held in a selected position within the duct 11, while the corresponding terminals on the program level 266 are initiating selected functions. The selector switch 283a on terminal 4 has a third position which is connected by conductor 356 to the coil 357 of relay 358. The normally closed switch 359 of relay 358 is connected between the conductor 361 to the coil 277 of relay 274 and the completion switches 278b and 278c in the timer 32 and printer 59, respectively. Thus, when the switch 283 on terminal 4 is in the third position, the switch 359 in open and the completion switches 278b and 278c are ineffective.

OPERATION

Before considering the operation in detail, the data which is produced by the test apparatus of the invention is summarized briefly. In this particular embodiment, it is desired that the printer 59 provide the fan brake-horsepower, the fan c.f.m. and the fan total pressure in a form which is immediately available for plotting a performance curve defined by at least eight, spaced points, such points corresponding to the gates or conditions of delivery controlled by the cone 18. Certain additional, auxiliary information, such as instantaneous values of velocity pressure, barometric pressure and certain temperatures are plotted at and during timed intervals upon the tape 50 by the recorder 49. This auxiliary data, which may be needed to establish the validity of the performance test, may be plotted as a graph, which will normally require conversion into usable values.

Average temperature at the fan inlet is sensed by temperature transducers 37 and fed to the amplifier-attenuator 39 as an electrical potential which is then fed to the recorder 49 and plotted on the tape 50. In a similar manner, the temperature at the Pitot head 16 is sensed by transducer 38, converted into an electrical potential, amplified by 41 and recorded by 49 on tape 50. Dry-bulb and wet-bulb temperatures near the fan inlet and barometric pressure are sensed by means including the sensing head 171 of the air density computer 48 and are converted into electrical potentials which are fed to the air density computer and thence to the recorder 49 where they are plotted on the tape 50.

Fan brake-horsepower equals $$\frac{2\pi NT}{33000}$$

which equals r.p.m. × a constant.

Fan brake-horsepower is obtained as follows: the torque of the fan shaft 8 is sensed by the torque pick-up 15 and an electrical potential proportional to such torque is fed to the amplifier-attenuator 36. The attenuation in the amplifier-attenuator 36 is adjusted by the potentiometer control 141 for the particular r.p.m. The voltage output of the attenuator 46 is also corrected by the air density computer 48 to standard air density. The amplifier-attenuator 36 multiplies the value of the torque by a constant and by the r.p.m. Instantaneous values of brake-horsepower over the interval timed by the timer 32 (FIGURE 1) are plotted on tape 50 by the recorder 49. The same values of brake-horsepower are integrated over the same interval of time by a velocity servo 52 and are summed by the counter 56 during the twenty intervals corresponding to the twenty Pitot tube positions into which the stepping switch 209 moves the Pitot tube 16 during each of the eight or more gate settings. The summations of the counter 56 are then printed by the printer 59 as a single average brake-horsepower for each gate on the tape 63.

The fan c.f.m. equals the square root of velocity pressure×4003×duct area, which equals the square root of velocity pressure×the constant×the duct diameter.

Fan c.f.m. is determined by the test apparatus of FIGURE 1 in the following manner: the velocity pressure in duct 11 is sensed by the Pitot tube 16 and transmitted to the transducer 42 which converts such pressure into an electrical potential which is fed to the amplifier-attenuator 46. The output voltage from amplifier 46 is corrected by the air density computer to standard air density and instantaneous values of the velocity pressure are fed during each timed interval to the recorder 49 and plotted upon the tape 50 thereof. The corrected output voltage of amplifier 46 is also fed to the attenuator 154 which corrects such voltage for the proper duct diameter and multiplies the velocity pressure by a constant. The square root of the output from attenuator 154 is extracted by recorder 51 and its instantaneous value is plotted on tape 62. This instantaneous value of c.f.m. is integrated over each timed interval by the velocity servo 53 and summed during twenty such intervals by the counter 57 so that a single average value for each gate, comprising said twenty intervals, is printed on the tape 63 by the printer 59 in response to an appropriate signal from the programmer 29.

Fan total pressure equals dynamic pressure plus friction from the fan to the measuring point, which equals $$DP \text{ plus } .02 \times \frac{L}{D} \times \text{velocity pressure}$$

which equals dynamic pressure plus a constant multiplied by the velocity pressure.

Fan total pressure is obtained as follows: The dynamic pressure is sensed by the Pitot tube 16 and fed to the transducer 43 which converts the pressure into an electrical potential fed to the amplifier-attenuator 47. Instantaneous values of the dynamic pressure are fed from the amplifier-attenuator 47 during each timed interval to the recorder 49 and plotted on the tape 50. Such instantaneous values of dynamic pressure are also fed to the velocity servo 54. Linear values proportional to velocity pressure multiplied by a constant are fed from the extractor 51 to the velocity servo 54 where they are added to the value of the dynamic pressure and their instantaneous sums are integrated over the timed intervals by the velocity servo 54 and fed to the counter 58 where they are collected and totalled during each gate. Pulses from the counter 58, which represent such summation, are then fed to the printer 59 and recorded in usable terms upon the tape 63 in response to a signal from the programmer 29.

The speed of the fan 10 is held constant during the entire performance test so that no speed correction is required in the test data produced by the printer 59. However, such r.p.m. may be printed as a matter of convenience by the printer 59, if it is desired. The operation of the test apparatus as applied to a conventional fan 10 connected to an outlet duct 11 will now be considered in detail, particularly with respect to the operation of the control circuit including the programmer 29.

Operation of the fan equipment including the fan 10 and duct 11 may be substantially conventional. It will be recognized that the test apparatus and method of the invention may be applied to a variety of different gas moving devices and arrangements wherein there are ducts on either or both of the inlet and outlet of the device. Moreover, the device may be a centrifugal blower, a centrifugal exhauster or an axial flow fan. As required by the existing test code for testing air moving equipment of this type, a cone or gate 18 is placed adjacent to the outlet end of the duct 11 for the purpose of varying the delivery of the fan. More specifically, the cone 18 controls the fluid flow to pressure ratio within the duct 11. The fan wheel 9 is driven by a motor 13, the speed of which is preferably controlled and held constant by the speed control 14.

Referring particularly to FIGURES 2, 3 and 5, it will be observed that the Pitot tube positioner is arranged so that the linkage 21 thereof pivots the Pitot tube 16 around an axis passing through the Pitot tube opening 76 in the duct 11, which axis is substantially parallel with the axis of the duct 11.

By reference to FIGURE 5, for example, it will be seen that as the beam 20 is pivoted upwardly, the cable 20 will tend to unwind from the small pulleys 92, 93, 116 and 117, while tending to wind upon the large pulleys 118 and 119. However, the center line distances between these relative pulleys will at all times remain the same. Thus, by providing pulleys 118 and 119 which are twice as large in diameter as the smaller pulleys 92, 93, 116 and 117, no slack or excessive tension will be created in the cable 122, during such pivotal movement.

The sensing head 171 containing the thermometers 165 and 166 (FIGURE 10) is preferably placed in the air stream to the inlet of the fan 10 (FIGURE 1) and the pressure transducer 167 is spaced from the fan 10. The Pitot tube 16 is mounted upon the Pitot positioner 17, as appearing in FIGURE 2, so that it extends through the Pitot opening 76 in the side of the duct 11. The thermometer 38 is then placed in position within the duct 11 near the Pitot tube 16. The output of the amplifier 217 (FIGURE 11) is adjusted for duct size by means of the variable resistance 213.

The pivot axis of the Pitot tube 16 is intentionally located substantially along the inner surface of the duct 11, regardless of its size. Thus, the operation of the insertion servo unit can be caused to accommodate an increase in duct size by reducing the current flow in the follow potentiometer 212, which is accomplished by the variable resistance 213. In this way, a constant multipulication of all insertion distances for all sizes of ducts is attained electrically. Moreover, the amount of insertion of the Pitot tube can be adjusted for the duct size without changing the angle of insertion, because any given test point for all sizes of ducts will, with this arrangement, lie along a straight line radiating into the duct 11 from the pivot axis of the Pitot tube 16.

The output of the attenuator 154 (FIGURE 1) is adjusted for duct size by means of the potentiometer control 156. The power lines 214 and 215 are connected to a source of electrical energy thereby energizing the electrical system of the test apparatus. The motor 13 is also connected to a source of electrical energy whereby impeller 9 in the fan 10 is set in operation. The output of amplifier 36 is adjusted for the fan r.p.m. by means of the potentiometer control 141.

If, at the beginning of a test operation, the wipers of the stepping switch 209 are not at the terminal 52, which is the starting position, the manual homing switch 293 (FIGURE 11) may be utilized to advance the wipers to terminal 52. More specifically, the homing switch 293 is closed, whereby the coil 268 of relay 270 is energized through its switch 291 and the stepping switch 209 is cocked. However, as soon as the switch 209 is cocked, switch 291 opens and coil 268 is de-energized so that switch 209 is stepped. Advancement of switch 209 permits switch 291 to close and thereby again completes the circuit through coil 268 which cocks switch 209 and, when de-energized, permits switch 209 to step again. This procedure for advancing switch 209 occurs rapidly and continuously, as long as homing switch 293 is closed, until the line from switch 293 to coil 268 is opened by the cam switch 289, which occurs as the wipers move from terminal 51 to terminal 52. Energization followed by de-energization of coil 268 will effect only one step of switch 209. The cam switch 289 is opened by cam 294 at terminal 52 so that the manual switch 279 must be used to step switch 209 to terminal 1. The normally open passing relay 287 is accordingly closed, whereby the stepping relay 270 is energized and then immediately de-energized by its switch 291, whereby the switch 209 is stepped to terminal 2. Grounding of the coil 268 through the passing switch 288 effects just one step because relay 287 operates as rapidly as relay 270 and, therefore, opens before relay 270 can operate a second time.

The cone control unit 31 (FIGURE 12) is energized by the cone initiating relay 296 when wiper 267 contacts terminal 2, whereby the sequence switch 297 is energized and, in turn, energizes the servo unit 300. The cone 18 is moved by the servo motor 298 into a selected position with respect to the duct 11 where it remains for the first sequence of operations involving at least one complete traverse of the Pitot tube 16 along two of the four lines of position 19, 19a, 19b or 19c, shown in FIGURE 2. Two traverses at right angles, each including ten positions, are the minimum required according to the test code and are provided along lines 19 and 19a in this embodiment. However, under some circumstances, it may become desirable to provide additional traverses or different patterns and such can be accomplished by appropriate selection of the resistances 219 and 237 (FIGURE 11) and by properly connecting the terminals of the stepping switch 209 to said resistances and to the passing relay 287.

When the positioning of the cone 18 is completed, the null sensor 299 (FIGURE 12) operates to close the completion switch 278a in the null sensor, whereby the starting relay 274 (FIGURE 11) is closed. Accordingly, the stepping relay 270 is momentarily energized through the slow-to-operate relay 273 and as soon as the switch 275 of relay 273 opens, coil 268 is de-energized so that the stepping switch 209 is automatically advanced to terminal 3.

Closure of any one of the completion switches 278 will close the starting relay 274 whereby current can flow from the relay power supply 271 through the line 269 and the coil 268 of the stepping switch 209, the line 272, the normally closed switch of the delay relay 273 and the starting relay 274 to ground, thereby initiating a stepping operation of the stepping switch 209, which is completed as soon as relay 273 operates and de-energizes the coil 268. As stated above, the coil 268 cocks a conventional type of spring actuated mechanism (not shown) which advances the stepping switch 209 one step as soon as the coil 268 is de-energized.

The switch 279 is used to "inch" the stepping switch 209 in a step-by-step operation, each step requiring a closing and opening of the switch. The switch 279 may be locked in the closed position, thereby maintaining the coil 277 energized and thereby preventing more than one step of the switch 209 by the switch 279 or the switches 278 until coil 277 has been de-energized. The completion switches 278 are associated with various components of the test apparatus, such as the timer 32, the cone control unit 31 and printer 59. Said completion switches are arranged so that they are closed by the termination of the operation of their components, thereby operating the stepping switch 209, as discussed above.

When the wiper 267 of the stepping switch 209 (FIGURE 11) is connected to terminal 3, the switch 303 (FIGURE 12) of the initiating relay 302 is closed, thereby energizing the calibration circuit 304 (FIGURE 12). This causes the transducers 42 and 43 to transmit to the amplifiers 46 and 47, respectively, a potential simulating a selected calibration pressure of a predetermined value.

After a preselected time interval following the energization of the calibration circuit 304, the slow-to-operate switch 306 will close, thereby energizing the timer 32 and initiating a timed operation of the computer 33 which results in recording of the calibration data on the tape 50 of recorder 49 and on the tape 62 of recorder 51. The calibration data is also collected by the counters 56, 57 and 58. When the timer 32 times out, the count no longer accumulates in the counters and the completion switch 278b is closed in timer 32, thereby again energizing the relay 274 which causes the stepping switch 209 to advance one step. Accordingly, the wiper 267 of switch 209 is now moved to terminal 4.

The terminal 4 (FIGURE 12) is connected through its selector switch 283a and the initiating relay 307 to the digital printer 59 which is thus energized and causes the calibration data to be printed on the tape 63 (FIGURE 1). The completion switch 278c (FIGURE 12) in the printer 59 is thereafter closed whereby the coil 277 is energized, which causes the switch 209 to advance one step to terminal 5.

If it is desired to check the calibration data carefully before proceeding with the test, the selector switch 283a on terminal 4 is placed in the center position before the stepping switch leaves terminal 3. This prevents the stepping switch 209 from advancing to terminal 5 at the end of the calibration run. In fact, by placing any one of the switches 283 in neutral position, the operation of the computer 33 will be stopped when the wiper 267 engages the terminal associated with the neutralized switch. In this embodiment, the center position of the switch 283 on terminal 4 is connected to the coil 357, which opens the switch 359 and thereby disconnects the completion switches 278b and 278c from the coil 277. Thus, the calibration circuit can now be energized by the manual switch 305, or the printer 59 can be energized by the manual switch 309 without advancing the stepping switch 209. That is, a calibration operation can be initiated by switch 305 and, after the timer 32 has timed out, the calibration data can be printed by printer 59 in response to operation of switch 309, while switch 209 remains on terminal 4. The calibration run and print out can be repeated as often as desired.

When the calibration is satisfactory, the manual "inch" switch 279 is operated to energize the coil 277 which advances the stepping switch 209 to terminal 5. The switch 283a on terminal 4 is then connected to the coil of relay 307 so that a calibration test will be conducted automatically, as set forth above, when the switch 209 returns to terminal 4 in the next sequence of operations of switch 209.

The terminal 5 on level 266 is connected to the timer 32 through the null switch 311 in relay 28. The timer 32 will not initiate any action in the computer 33 until null switch 28 is closed and, therefore, until the Pitot tube is in its proper position, which is controlled by levels 222 and 232. Normally, terminals 1 to 5 and 52, inclusive, on these levels will be connected in parallel so that the Pitot tube will be in the first position while stepping switch 209 is on any of these terminals. Accordingly, when terminal 5 is reached, a turning sequence will be initiated by timer 32 and test data will be collected and recorded by the computer 33.

The wiper 257 on the signal level 256 will connect a different lamp 259 to the power lines 214 and 215 each time said wiper 257 engages a different terminal 258. If, for any reason, the Pitot tube 16 is not at the desired initial sampling position when terminal 5 is engaged by the wipers of the stepping switch 209, the appropriate servo units 26 and 27 will be energized. Initial attention is now directed to the operation of the insertion servo unit 26.

A discrete resistance will be placed in series with the amplifier 217, thereby causing the insertion motor 22 to rotate in a well-known manner and move the wiper 218 until the follow potentiometer 212 is in balance with the control potentiometer 211. At the same time, the insertion motor 23 will move the wiper 251 of the insertion potentiometer 248 and rotate the drum 114 (FIGURE 5) thereby causing the cable 122 to move around the various pulleys on the linkage 21 so that the slide block 94, hence the Pitot tube 16, is moved lengthwise of the beam 20. When the servo motor 23 comes to rest, the Pitot tube 16 will have been moved the proper distance lengthwise thereof to satisfy a predetermined positional requirement within the duct 11.

While the servo unit 26 is operating as indicated in the preceding paragraph, a similar operation will be carried out in the angle servo unit 27. That is, a discrete resistance will be placed in series with the servo amplifier 237 whereby the servo motor 24 is rotated and the Pitot tube is pivoted around an axis adjacent to the duct 11. It has been found that, as the extension of the Pitot tube 16 into the duct 11 (FIGURE 2) is increased, the amount of droop or downward deflection of said Pitot tube due to its weight tends to increase. Moreover, the amount of such deflection tends to decrease for a given amount of insertion as the tube is pivoted away from a substantially horizontal position.

Compensation for tube deflection is accomplished in this particular embodiment by feeding an additional electrical potential from transformer 249 into the line 247 between the amplifier 237 and the wiper 246. As the insertion motor 23 increases the insertion of the Pitot tube 16 into the duct 11, a corresponding electrical potential from the secondary 245 is fed to the cosine potentiometer 252 and thence through the line 247 and the amplifier 237 to the angle motor 24. Since the deflection of the Pitot tube 16 is always downward, any potential from the insertion potentiometer 248 always urges the armature of the angle motor 24 to raise the tube above the normal position signalled by the control potentiometer 238.

As indicated above, the amount of insertion of the Pitot tube 16 into the duct 11 is not alone determinative of the amount of droop of the Pitot tube. More specifically, the amount of droop in the Pitot tube is much greater when said tube is in a substantially horizontal position than it is when said tube is at an angle of 60 degrees, for example, with respect to the horizontal. Accordingly, further compensation must be made in the operation of the angle motor 24 to adjust the droop correction to the angle of the Pitot tube. This is accomplished by the cosine potentiometer 252 which diminishes the voltage from the secondary 254 in proportion to the angle of the tube 16 with respect to the horizontal. That is, when the Pitot tube is in a substantially horizontal position, the wiper 254 of the cosine pot 252 will be substantially centered and, therefore, will not diminish the electrical potential from the transformer 249 through the insertion potentiometer 248 to line 247. However, it will be seen that as the wiper 254 moves away from the center tap on potentiometer 252 in either direction, whether the Pitot tube is sloping upwardly or downwardly, the voltage from the insertion potentiometer 248 is reduced by the cosine potentiometer 252. Thus, maximum angular compensation is made when droop conditions are maximum, as previously indicated. The cosine potentiometer 252, as its name implies, is wound to produce an output voltage which is a cosine function and thereby correctly compensates for the droop in the varying angular positions.

When the inputs to the amplifier 237 have nulled, the angle motor 24 will be at rest, and the angle of the Pitot tube 16 with respect to the horizontal will be as desired for a pressure sensing operation within said duct 11. The two equal resistance legs in the cosine potentiometer 252 on opposite sides of the center tap connected to the wiper 251 of the insertion potentiometer 248 insure identical correction of the insertion angle, regardless of whether the wiper 254 is moved in one direction or the other by corresponding rotations of the angle motor 24. The insertion potentiometer 248 insures that the amount of angle correction by the potentiometer 252 will be directly proportional to the amount of insertion.

As soon as both the angle motor 24 and insertion motor 23 have come to rest, the resultant nulls produced in their respective servo units 27 and 26 will cause the null sensing relay 28 to close and thereby energize the coil 281 (FIGURE 12) of the function relay 282. Thus, the timer 32 will be energized and the operation of the computer unit 33 will proceed in a manner substantially as set forth above with respect to the calibration operation. However, the various data sensing and detecting elements associated with the computer unit 33 will now be collecting actual test data for the purpose of collecting, integrating and recording such data.

When the timer 32 is energized, it immediately causes the counters 56, 57, 58 and 60 to collect electrical impulses from the velocity servos 52, 53 and 54 and the pulse transmitter 14, respectively. Such collection is terminated when the timer 32 times out, which is at the end of precisely three seconds in this embodiment. The timer 32 also controls the period during which the recorders 49 and 51 plot data on the tapes 50 and 62, respectively. In this embodiment, the recorders 49 and 51 will plot their data during each period of the timer 32, hence for each position of the Pitot tube 16.

At the end of the time out, a function switch 278b associated with the timer 32 is closed, thereby energizing the relay 274, which causes the stepping switch 209 to advance one step to its terminal 6. By reference to FIGURES 11 and 12, it will be seen that terminal 6 is also connected on level 266 to terminal 5 so that the function just described, whereby the measurements are taken is repeated. However, by changing the terminal positions in the insertion level 222 and angle level 232, the resistances 219 and 239 are changed, thereby effecting an operation of the servo motors 23 and 24, which produces a change in the position of the Pitot tube 16. When the servo motors 23 and 24 come to rest, the null-sensing relay 28 is once again closed, thereby permitting the function relay 232 to close and initiate another timed operation of the computer 33.

Referring to FIGURE 12, it will be seen that terminals 5 to 14 and 16 to 25, inclusive, in this particular embodiment, are all connected at the programming level 266 to the null-sensing relay 28. Thus, operation of the test apparatus when the stepping switch 209 is on any one of these terminals will be the same as described above with respect to the operation when at terminals 5 and 6, except that the Pitot tube will preferably be in a different position for each such position of switch 209.

The terminals 5 to 14, in this embodiment, produce the Pitot positions 19 (FIGURE 2) and the terminals 16 to 25 produce the Pitot positions 19a. The terminals 1, 15 and 26 to 48 are connected by their switches 283 to the passing relay 287. It will be recognized that additional terminals 264 may be connected by their switches 283 to the sensing relay 28 for the purpose of producing additional control positions for additional Pitot tube positions produced by the levels 222 and 232. For example, terminals in levels 222 and 232, which correspond to the terminals 28 to 37 (FIGURE 12) in level 266, can be used to effect positioning of the Pitot tube in the positions 19b of FIGURE 2 and terminals 39 to 48, for example, can be used for positions 19c.

It will be seen that, by appropriate selection and arrangement of the resistances 219 and 239 (FIGURE 11) in the servo units 26 and 27, respectively, the terminals 5 through 48, inclusive, can be used to effect a variety of different movement patterns for the Pitot tube 16. For example, the tube 16 (FIGURE 1) can be caused to move in a spiral pattern either expanding or contacting, or in a series of concentric circles of different radii.

At the end of a sequence of operations involving the terminals 5 to 14, for example, the stepping switch moves onto terminal 15, which is connected to the passing relay 287, but could be connected to the print-out relay 307, if desired. At the end of a sequence of operations involving the terminals 16 through 25, inclusive, the switch 209 moves along a series of terminals 26 to 48, inclusive, which are all connected to the passing relay 287, in this embodiment. Terminal 49 is connected by its switch 283 and the relay 307 to the printer 59 which is thus energized and caused to receive from the counters 56, 57, 58 and 60 the impulses accumulated thereby, integrate such impulses and convert them into printed data upon the tape 63. This data preferably includes B.H.P., c.f.m. and total pressure and is sequentially printed on the tape by suitable scanning mechanism in the printer 59. Print-outs of static pressure, velocity pressure, r.p.m. and similar data may be provided by the printer 59, if desired.

When the printer 59 has completed the printing operation initiated at terminal 49, the completion switch 278c is closed, thereby energizing the relay 274 and causing the stepping switch 209 to advance to terminal 50, which is connected to the calibration circuit 304 for an automatic calibration test. This is followed by a step to terminal 51 and a printing of the calibration data by printer 59, followed by a step to terminal 52 and a halt in the test operation. If the calibration data checks out, the inch switch 279 is operated and switch 209 is thus stepped to terminal 1 where the entire sequence of operations discussed above is then repeated. That is, two 10-position traverses of the Pitot tube have now been completed for one gate position or condition of fan delivery. Additional traverses for other deliveries may be conducted in the same manner.

In this embodiment, a new sequence of operations cannot be initiated without positive action by the operator. That is, the cam switch 289 is opened by cam 294 at the end of each sequence by the switch 209. However, connecting switch 283 at terminal 52 to the passing relay will provide continuous or automatic operation of the test apparatus.

ALTERNATE STRUCTURE

Figure 14:
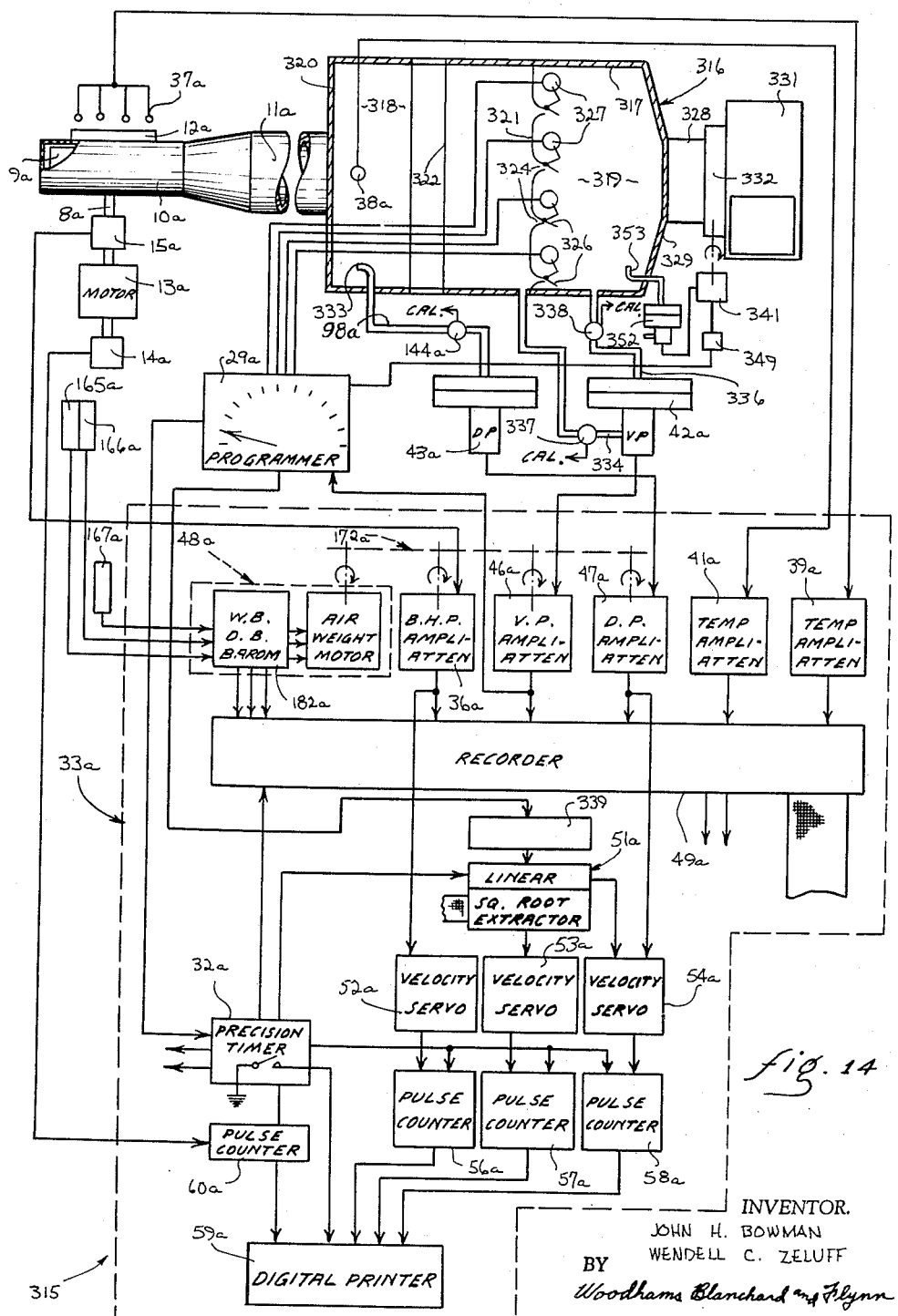
FIGURE 14 is a partially elevational and partially central cross-sectional view of a modified test apparatus, including its circuitry.
Figure 15:
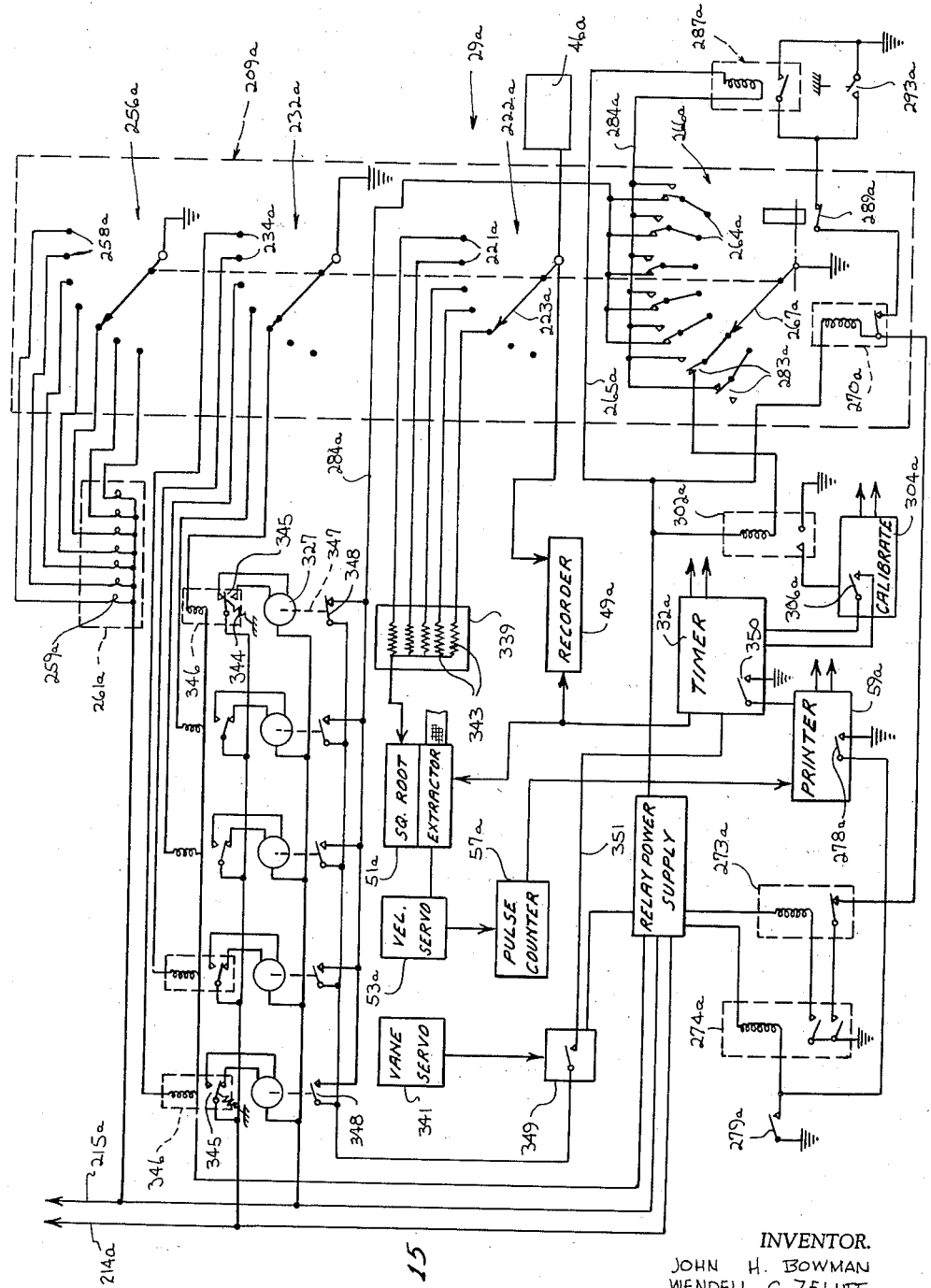
FIGURE 15 is a circuit diagram of a portion of the electrical circuitry utilized in the alternate apparatus shown in FIGURE 14.

FIGURES 14 and 15 illustrate a modified data collection system 315 wherein the applicant's invention is adapted for use in what is known as the nozzle-chamber procedure for testing the performance of an air-moving device. Substantially all of the parts utilized in the modified data system 315 of FIGURE 14 may be substantially the same as the corresponding parts in the principal embodiment of the data system disclosed in FIGURE 1. Accordingly, where such close similarity exists, parts of the modified data system 315 will be given the same numerals, in addition to suffix "a," as their corresponding parts in the data system of FIGURE 1.

A fan 10a (FIGURE 14) is connected by a duct 11a to one end of a chamber housing 316 defining an elongated chamber 317 having a cross section which is much larger than the cross section of the duct 11a and communicates therewith through one end wall 320. The chamber 317 is divided into upstream and downstream compartments 318 and 319, which are separated by a partition 321 extending across the chamber 317. An air-straightening device 322 is placed across the compartment 318 between the partition 321 and the upstream end wall 320. The partition wall 321 is provided with a plurality of nozzles 324 and corresponding nozzle valves 326 which are opened and closed by the motors 327 in any convenient manner.

The downstream compartment 319 is connected by a duct 328 through its downstream end wall 329 to the inlet of an exhaust fan 331 which is provided with an inlet vane control 332 of any conventional type, such as the "Vortex Control" manufactured by Clarage Fan Company of Kalamazoo, Michigan.

The wheel 9a in the fan 10a is mounted upon a shaft 8a driven by the motor 13a, the r.p.m. of which is controlled by the speed control 14a. The speed control 14a is connected to a pulse counter 60a in the computer unit 33a. Said computer unit 33a includes amplifier attenuators 36a, 46a, 47a and 39a as well as the air density computer 48a. The resistance-bulb thermometers 37a at the fan inlet 12a are connected to the amplifier-attenuator 39a. The resistance-bulb thermometer 38a in the upstream compartment 318 is connected to the amplifier-attenuator 41a and the torque pick-up 15a is connected to the amplifier-attenuator 36a. The air-density computer 48a includes resistance-bulb thermometers 165a and 166a and a pressure transducer 167a which are connected to the amplifier 182a of the air density computer 48a.

A pressure transducer 43a (FIGURE 14) is connected through the conduit 98a to a fixed position Pitot tube 333, which senses total pressure in the upstream compartment 318 between the end wall 320 and the air straightener 322. An electrically operated valve 144a is provided in the conduit 98a for the purpose of closing same during a calibration run of the testing apparatus 315. One side of the transducer 42a is connected by a conduit 334 to the upstream compartment 318 and the other side of said transducer 42a is connected by a conduit 336 to the downstream compartment 319, both near the partition wall 321. Electrically operated valves 337 and 338 are provided in the conduits 334 and 336, respectively, for closing them during a calibration run. The transducer 43a is electrically connected to the amplifier-attenuator 47a and the transducer 42a is electrically connected to the amplifier-attenuator 46a. The air density computer 48a (FIGURE 14) and the amplifier-attenuators 36a, 39a, 41a, 46a and 47a are all electrically connected to the recorder 49a, which plots their output voltages in graphs which are easily translated into temperatures, pressures and brake horsepower. The programming device 29a (FIGURE 15) includes a stepping switch 209a which may be substantially identical to the stepping switch in the programming device 29 of FIGURE 11. That is, the stepping switch 209a in the programming device 29a has a programming level 266a and three function levels 222a, 232a and 256a. The program level 266a and signal level 256a of the programming device 29a are similar in use and operation to their corresponding levels 266 and 256 in programming device 29 of FIGURE 11.

The function level 222a has a wiper 223a which is connected to the attenuator-amplifier 46a. Level 222a also has a plurality of terminals 221a, some of which are connected respectively to a plurality of resistances 343 in the attenuator 339 for the purpose of correcting the value of its output voltage for the calibration and throat area of the particular nozzle 324 or combination of nozzles which is open at any selected time. The corrected output of attenuator 339 flows through the recorder 51a, the velocity servo 53a and the pulse counter 57a to the printer 59a.

Level 232a of the programming device 29a has a plurality of terminals 234a, some of which are connected individually (but may be in combinations) to the relays 346, whereby the valve motors 327 are energized to operate the valves 326 (FIGURE 14). Each relay 346 has a double throw switch 345 which is closed on one pole by the relay coil to rotate the reversible valve motor in one direction. When the relay 346 is de-energized, the spring 344 moves the switch armature to the other pole, whereby the rotation of the motor 327 is reversed. The spring 344 normally causes the switch to energize the motor 327 so that it will close its respective valve 326 (FIGURE 14). Each motor 327 (FIGURE 15) is connected by linkage 347 to an initiating switch 348 whereby the timer 32a can be connected through the conductor 351 and null sensing relay 349 to one of the terminals in the program level 266a. It will be recognized that the particular valve control mechanism described herein is for illustrative purposes only.

The terminals 258a (FIGURE 15) of the level 256a are connected to individual lamps 259a in the lamp bank 261a and thence to a source of electrical energy.

As in the case of the programming level 266, each terminal on the programming level 266a is connected to a manually operable, two-pole selector switch 283a, one pole of which is connected by conductor 284a to the passing relay 287a. When the passing relay 287a is energized through conductor 265a by the relay power supply 271a, it closes the circuit to the stepping relay 270a in substantially the same manner and for substantially the same purposes as set forth above with respect to the passing relay 287 and stepping relay 270.

Terminal 2 of program level 266a (FIGURE 15) is connected to a calibration relay 302a which energizes the calibration circuit 304a having a delayed operation switch 306a, which energizes the timer 32a. The timer 32a has a completion switch 350 which is closed at the end of the timing operation by the timer 32a and energizes the printer 59a. At the end of a printing operation by the printer 59a, the completion switch 278a therein is closed. This energizes the relay 274a which results in advancing the stepping switch 209a one step, as set forth above with respect to the corresponding structure disclosed in FIGURE 11.

Terminal 3 in the program level 266a (FIGURE 15), as well as the necessary number of succeeding terminals 264a in said program level 266a, are connected by the conductor 284a to one terminal of each of the initiation switches 248 operated by the valve motors 327. Accordingly, the first two terminals in level 222a are preferably disconnected since no function is performed on this level while the passing and calibration functions are being performed. The first two terminals in level 232 are connected to terminal 3 which is connected to the relay 346 on the first valve motor 327. Accordingly, at least one nozzle 324 (FIGURE 14) will be open whenever the data system 315 is in operation.

The null sensing relay 349 (FIGURE 15) is electrically connected to and is controlled by the servo unit 341 which may be similar in construction and operation to the servo unit 26 of FIGURE 11. The servo unit 341 (FIGURE 14) which controls the inlet valve control on the fan 331, is responsive to the control of the pressure transducer 352. One side of the transducer 352 is connected by the conduit 353 to chamber 319 and the other side is connected to atmosphere. The servo unit 341 is arranged to maintain zero pressure differential in the transducer 352 by means of the inlet vane control 332 and the exhaust fan 331.

The circuitry of the programming level 266a includes the manually operable "inching" and "homing" switches 279a and 293a, respectively, and the cam actuated switch 289a for substantially the same purposes as set forth above with respect to the corresponding parts in the circuitry of the program level 266 (FIGURE 11).

OPERATION OF MODIFIED DATA SYSTEM

The operation of the modified data system 315 of FIGURES 14 and 15 is generally the same in principle as the operation of the data system disclosed in FIGURE 1.

The modified data system 315 is arranged so that the air delivered by the fan 10a enters the upstream compartment 318 of the chamber 317 after which it passes through those nozzles 324 which may be open into the downstream compartment 319. The air in the downstream compartment 319 then discharges through the duct 328 and exhaust fan 331 to atmosphere. The vane control 332 operates to maintain a selected pressure differential between the compartment 319 and atmosphere.

The first terminal on each level performs no function. The second terminal effects a calibration of the system followed by a print-out of the calibration data. The third terminal, which is the first test terminal, initiates a test operation which culminates in a print-out by the printer 59a of the performance data for the first gate or condition of delivery. Seven or more, preferably succeeding, terminals on the program level are also connected to initiate test operations, each of which terminates with a print-out of performance data for another condition of delivery. Normally, the delivery conditions or determinations will range from substantially no delivery to substantially free delivery.

The nature of the nozzle-chamber test procedure is that each test terminal, hence each nozzle setting, represents a different delivery condition, and only one sensing or collecting of pressure data is required. Accordingly, the completion switch 350 of the timer is connected directly to the printer 59a for the purpose of effecting a print out of the fan performance data at each delivery condition. Accordingly, a stepping operation of the programming device 29a is normally initiated either by the passing relay 287a or by the printer 59a.

The level 222a serves to correct the attenuator 339 for each change in nozzle or nozzle combination produced by the function level 232a. The lamps 259a indicate the terminal being engaged by the switching device. The data printed by the printer 59a includes brake horsepower, c.f.m., r.p.m. and total pressure, in this embodiment. Other data can be printed, if desired.

The volume of air moved through a nozzle 324 or any combination of such nozzles will equal the square root of the pressure differential on the opposite sides of the partition wall 321 multiplied by 4003, by the value of the nozzle calibration, and by the value of the nozzle throat area corrected for standard density. That is, the air volume (moving through the partition wall) $=\sqrt{PD \times K}$ where K has a different value for each nozzle or combination of nozzles. The resistances 343 associated with the attenuator 339 provide the proper K required for each nozzle setting or gate.

Although particular preferred embodiments of the invention have been disclosed above for illustrative purposes, it will be understood that variations or modifications of such disclosure which lie within the scope of the appended claims are fully contemplated.

What is claimed is:

1. An apparatus for testing the performance of a fluid moving device, comprising: means defining a path for said fluid; drive means causing the fluid moving device to move said fluid along said path; control means for adjusting the ratio of the flow of said fluid to the pressure of said fluid within said path; a pressure sampling means in said path; transducer means connected to said pressure sampling means for converting into electrical potentials the pressure sampled; computer means receiving said electrical potentials and including means for automatically adjusting said electrical potentials in response to changes in the density of said fluid, and means for converting said adjusted potentials into a recordable output; and programming means operatively connected to said control means and said computer means for effecting periodic alternate operation thereof.

2. An apparatus for testing the performance of a fluid moving device, comprising: means defining a path for said fluid; drive means causing the fluid moving device to move said fluid along said path; a pressure sampling means in said path; control means for positioning said pressure sampling means and moving same within said path; transducer means connected to said pressure sampling means for converting into electrical potentials the pressures sampled; computer means receiving said electrical potentials and converting said potentials into a recordable output; and programming means operatively connected to said control means and said computer means for automatically effecting periodic alternate operation thereof.

3. The structure of claim 2 wherein said programming means includes a timing device arranged to de-energize said computer means when the relative positions of said path and said pressure sampling means are being adjusted, and to energize said computer means upon the completion of said adjustment, whereby instantaneous pressures are integrated over a selected period when, and only when, said pressure sampling means is in a predetermined position in said path.

4. The structure of claim 2 including gate means for controlling the volume of fluid flowing along said path, said gate means being operatively connected to and controlled by said programming means.

5. The structure of claim 2 including power sensing means detecting and converting into an electrical potential the power output of said drive means; second transducer means detecting the dry bulb and wet bulb temperatures and the barometric pressure in the vicinity of said fluid moving device and converting such detections into electrical potentials; computer means receiving the last-named electrical potentials and converting same into a force proportional to a ratio between ambient density and a selected density, and force sensing means operatively associated with said computer means and responsive to said force for adjusting the electrical potentials from said transducer means connected to said pressure sampling means and from said power sensing means, whereby the adjusted electrical potentials are corrected for air density.

6. An apparatus for testing the performance of a gas moving device, comprising: means defining a path for said gas; drive means causing said device to move said gas along said path; a pressure sampling means extendable into said path; positioning means supporting said pressure sampling means for movement into selected positions in said path; transducer means connected to said pressure sampling means for converting into electrical potentials the pressure sampled; computer means receiving said electrical potentials and including means for automatically adjusting said electrical potentials in response to changes in the density of said fluid, and recorder means for receiving said adjusted potentials and converting same into recorded data; and programming means operatively connected to said positioning means and said computer means for effecting periodic, alternate operation thereof.

7. An apparatus for testing the performance of a gas moving device having an outlet duct communicating therewith, comprising: rotary drive means connected to said device for effecting the movement of said gas through said duct; a pressure sampling means extendable into, and capable of being moved into a plurality of positions within, said duct; positioning means supporting said sampling means for effecting said movement thereof within said duct; transducer means connected to said pressure sampling means for detecting pressures sampled thereby and converting said pressures into electrical potentials; power sensing means detecting the power output of said drive means and converting same into an electrical potential; speed sensing means connected to said drive means for converting the rotations of said drive means into electrical impulses; first computer means receiving said electrical potentials and impulses and converting them into recorded data corresponding to the detections of said sensing and sampling means; means including a transducer and a plurality of resistance bulb thermometers in the vicinity of said gas moving device for detecting temperatures and pressure and converting them into electrical potentials; second computer means receiving the last-named electrical potentials and converting same into a force corresponding to a correction for density; electromechanical means connected to said second computer means and responsive to said force for adjusting the electrical potentials received by said first computer and thereby correcting same for density; and electrical control circuitry including a sequentially operated, plural bank stepping switch, a pair of closed loop servo units and a timer connected between said positioning means and said first computer for effecting periodic, alternate operation thereof, the operation of said first computer being controlled by said timer and the operation of said positioning means being controlled by said stepping switch.

8. In an apparatus for testing the performance of a gas moving device, the combination comprising: a duct connected to the outlet of said device; an elongated Pitot tube slidably extending through an opening in the side wall of said duct; positioning means substantially outside of said duct and supporting said Pitot tube for lengthwise movement thereof transversely of said duct through the opening in the side wall thereof; mounting structure supporting said positioning means for effecting pivotal movement of said positioning means around an axis substantially parallel with the axis of said duct and adjacent to the opening through the side wall thereof; first actuating means supported upon said mounting structure and located entirely externally of said duct for effecting said pivotal movement of said positioning means; and second actuating means supported upon said mounting structure entirely externally of said duct for effecting said lengthwise movement of said Pitot tube.

9. An apparatus for controlling the position of an elongated Pitot tube, comprising: a mounting structure; an elongated guide beam slidably supporting said tube for movement lengthwise thereof; linkage means including a pantograph pivotally connected to and between said guide beam and said mounting structure for effecting pivotal movement of said beam around an axis perpendicular to said beam; first drive means supported upon said mounting structure and operably engaging said pantograph for effecting movement thereof with respect to said axis; second drive means supported upon said mounting structure; and means including a plurality of pulleys supported upon said beam and said pantograph, and an elongated cable extending around said pulleys and connected between said Pitot tube and said second drive means for effecting lengthwise movement of said tube along said beam in response to operation of said second drive means.

10. The structure of claim 9 wherein said second drive means is a motor having a drum supported thereby; wherein said cable is endless and extends around said drum; and wherein said cable is held taut at all times.

11. In an apparatus for determining the pressure of a gas flowing through a duct having an opening through the side wall thereof through which a Pitot tube slidably and pivotably extends, the combination comprising: a Pitot tube; an elongated beam slidably supporting the Pitot tube for movement lengthwise thereof; a first pulley rotatably supported upon said beam near one end thereof; a mounting structure; linkage secured to said beam near the other end thereof and pivotally supporting said beam upon said mounting structure for effecting pivotal movement of said Pitot tube around a first horizontal axis transverse of the lengthwise axis of said beam and adjacent to the other end thereof; first rotary drive means connected to said linkage and supported upon said mounting structure for effecting said pivotal movement of said beam; second rotary drive means supported upon said mounting structure and rotatably supporting a drum for movement around a second axis spaced from said first axis; a plurality of pulleys supported upon said linkage for rotation around axes spaced from said first axis; and an endless cable extending tightly around said drum, said first pulley and said plurality of pulleys; means for connecting the cable to the Pitot tube.

12. The structure of claim 11 wherein said linkage is pivotally engaged with said beam and said mounting structure; and wherein said plurality of pulleys includes a first pair of pulleys rotatably supported upon said beam at a pivot point with said linkage, a second pair of pulleys rotatably supported upon said mounting structure at a pivot point of said linkage, and a third pair of pulleys rotatably supported upon said linkage and spaced from said first and second pair of pulleys, said third pair of pulleys each having diameters substantially equal to the combined diameters of one of said first pair of pulleys and one of said second pair of pulleys.

13. In a device for accurately positioning one end of an elongated, substantially stiff element, the combination comprising: mounting structure; guide means supporting said element for movement lengthwise of said element into a position wherein one end of said element extends substantially beyond the adjacent end of said guide means, said guide means being supported upon said mounting structure for pivotal movement of said guide means around a horizontal axis intersecting the lengthwise axis of said element near said adjacent end of said guide means; means including a first closed loop servo unit for effecting said lengthwise movement of said element; a second closed loop servo unit including a variable resistance for effecting said pivotal movement of said guide means; and means responsive to both the angular position of said guide means around its pivotal axis and the distance between said one end of said element and said adjacent end of said guide means for changing said variable resistance in said second servo unit.

14. The structure of claim 13 wherein said second servo unit includes a second variable resistance in series with the first named resistance, said second resistance having a wiper mechanically coupled with said first servo unit; and wherein said second servo unit includes a third variable resistance in series with said first named resistance and having a wiper mechanically coupled with said second servo unit.

15. A method of conducting a performance test of a gas moving device having a rotating impeller and means defining a path of air movement from said impeller, the steps including: sensing the pressure of the gas at selected points in said path and converting the sensed pressures into electrical potentials; detecting the torque required to rotate said impeller and converting it into an electrical potential proportional to brake horsepower; detecting the wet bulb and dry bulb temperatures and the barometric pressure in the vicinity of said device and converting such detections into an electrical potential proportional to the ratio of air density; applying said last-named electrical potential to the correction of the other electrical potentials; collecting and integrating the corrected electrical potentials for a selected period of time and converting same into recorded data.

16. In an apparatus for detecting the pressures developed by an air moving device and converting such pressures into electrical potentials, a device for correcting such electrical potentials to standard density by compensating for the effects of temperature, pressure and water vapor, comprising: a servo unit including an amplifier and a potentiometer; a first, electrical, temperature sensitive transducer sensitive to dry bulb temperature connected in series with said amplifier, one side of said potentiometer and a first source of electrical potential; a second source of electrical potential and a series resistance in parallel with said first temperature sensitive transducer; an electrical, pressure sensitive transducer sensitive to barometric pressure having its input connected to a third source of electrical potential; a second electrical temperature sensitive transducer connected in series with said potentiometer, said second temperature sensitive transducer being sensitive to wet bulb temperature to compensate for water vapor, the output of said pressure sensitive transducer and a fourth source of electrical potential; and a fifth source of electrical potential and a series resistance in parallel with said second temperature sensitive transducer.

17. The structure of claim 1 wherein the means defining a path for said fluid includes a pair of adjacent chambers; and wherein said control means includes at least one passageway communicating between said chambers, and means for adjusting the flow of fluid through said passageway.

18. The structure of claim 1 wherein said means defining a path for the fluid includes a pair of adjacent chambers;
wherein said control means includes a plurality of nozzles communicating between said chambers and mechanism for adjusting the flow of fluid through said nozzles;
wherein said pressure sampling means includes conduits communicating with both of said chambers;
wherein said fluid moving device is connected with one of said chambers; and
including a second fluid moving device and conduit means connecting said second fluid moving device to the other chamber.

19. The structure of claim 1 wherein the fluid moving device has an outlet and the means defining the path for the fluid is an elongated duct connected to said outlets;
wherein said control means includes a gate for obstructing the flow of fluid through the end of said duct remote from the fluid moving device, and means for adjusting the position of said gate with respect to said remote end of said duct; and
wherein said pressure sampling means includes a Pitot tube extending into said duct, and means for moving said Pitot tube with respect to said duct.

References Cited in the file of this patent

UNITED STATES PATENTS

| | | |
|---|---|---|
| 2,550,603 | Russel | Apr. 24, 1951 |
| 2,612,776 | Klas | Oct. 7, 1952 |
| 2,722,641 | Cross | Nov. 1, 1955 |
| 2,751,786 | Coulbourn et al. | June 26, 1956 |
| 2,791,905 | Cheney | May 14, 1957 |
| 2,815,659 | Krupp | Dec. 10, 1957 |
| 2,857,760 | Heuver | Oct. 28, 1958 |

OTHER REFERENCES

Publication: Instruments and Automation, August 1958, pages 1366, 1367, article by Michaels et al., "Pressure Scanning System."

Publication: ASHRAE Journal, vol. 1, March 1959, pages 66–69, article by Pountney et al., "Automatic Computer For Fan Testing," copy in Scientific Library.